United States Patent
Otsuka et al.

(10) Patent No.: US 10,344,643 B2
(45) Date of Patent: Jul. 9, 2019

(54) EXHAUST PURIFICATION SYSTEM OF INTERNAL COMBUSTION ENGINE

(71) Applicant: HONDA MOTOR CO., LTD., Tokyo (JP)

(72) Inventors: Shinichiro Otsuka, Wako (JP); Kenji Katayama, Wako (JP); Noritaka Masumitsu, Wako (JP); Ryoko Yamada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/761,607

(22) PCT Filed: Sep. 24, 2015

(86) PCT No.: PCT/JP2015/076947
§ 371 (c)(1),
(2) Date: Mar. 20, 2018

(87) PCT Pub. No.: WO2017/051458
PCT Pub. Date: Mar. 30, 2017

(65) Prior Publication Data
US 2018/0347425 A1  Dec. 6, 2018

(51) Int. Cl.
*F01N 3/10* (2006.01)
*B01D 46/24* (2006.01)
(Continued)

(52) U.S. Cl.
CPC ............ *F01N 3/101* (2013.01); *B01D 46/247* (2013.01); *B01D 46/2429* (2013.01);
(Continued)

(58) Field of Classification Search
CPC .......... F01N 3/101; F01N 3/022; F01N 3/035; B01D 53/945; B01D 53/9477;
(Continued)

(56) References Cited

U.S. PATENT DOCUMENTS

2010/0205936 A1* 8/2010 Suzuki ............... B01D 53/9431
60/274
2010/0300078 A1* 12/2010 Lu ........................... F01N 3/035
60/297
(Continued)

FOREIGN PATENT DOCUMENTS

JP    2006-233935 A    9/2006
JP    2007-192055 A    8/2007
(Continued)

OTHER PUBLICATIONS

International Search Report and Written Opinion dated Dec. 1, 2015 corresponding to International Patent Application No. PCT/JP2015/076947, and English translation thereof.

*Primary Examiner* — George C Jin
(74) *Attorney, Agent, or Firm* — Squire Patton Boggs (US) LLP

(57) ABSTRACT

An exhaust purification system includes an LAF sensor provided in an exhaust pipe and generates a signal corresponding to an air-fuel ratio of exhaust gas. An upstream catalytic converter is downstream of the LAF sensor and has a catalyst to purify the exhaust gas. An O2 sensor is downstream of the upstream catalytic converter, and generates a signal corresponding to the air-fuel ratio of the exhaust gas. A GPF is downstream of a the O2 sensor and purifies the exhaust gas. An ECU controls an air-fuel mixture in an engine using output signal KACT of the LAF sensor and an output signal VO2 of the O2 sensor such that the air-fuel ratio of exhaust gas flowing into the GPF converges to a target value near the stoichiometric ratio. The GPF has a filter substrate and a downstream TWC supported by a partition of the filter substrate.

19 Claims, 14 Drawing Sheets

(51) Int. Cl.
*F01N 3/022* (2006.01)
*F01N 13/02* (2010.01)
*F01N 3/035* (2006.01)
*B01D 53/94* (2006.01)
*F02D 41/02* (2006.01)
*F02D 41/30* (2006.01)

(52) U.S. Cl.
CPC ....... *B01D 46/2474* (2013.01); *B01D 53/945* (2013.01); *B01D 53/9454* (2013.01); *B01D 53/9477* (2013.01); *F01N 3/022* (2013.01); *F01N 3/0222* (2013.01); *F01N 3/035* (2013.01); *F01N 3/10* (2013.01); *F01N 13/02* (2013.01); *F02D 41/0235* (2013.01); *F02D 41/30* (2013.01); *B01D 2046/2433* (2013.01); *B01D 2046/2437* (2013.01); *B01D 2255/1023* (2013.01); *B01D 2255/1025* (2013.01); *B01D 2255/2066* (2013.01); *B01D 2255/2068* (2013.01); *B01D 2255/908* (2013.01); *B01D 2255/9202* (2013.01); *B01D 2258/014* (2013.01); *B01D 2279/30* (2013.01); *F01N 2250/02* (2013.01); *F01N 2330/02* (2013.01); *F01N 2560/025* (2013.01); *F01N 2560/14* (2013.01); *Y02T 10/22* (2013.01)

(58) Field of Classification Search
CPC .............. B01D 53/9454; B01D 53/944; B01D 46/2474; B01D 46/247; F02D 41/30; F02D 41/0235; B01J 23/63; B01J 37/0242; B01J 37/0244; B01J 37/0248; B01J 29/123; B01J 29/126; B01J 29/44; B01J 29/7415; B01J 29/7469; B01J 29/85
See application file for complete search history.

(56) References Cited

U.S. PATENT DOCUMENTS

| | | |
|---|---|---|
| 2011/0030346 A1 | 2/2011 | Neubauer et al. |
| 2011/0219746 A1* | 9/2011 | Yezerets ................. F01N 3/035 60/274 |
| 2014/0044626 A1 | 2/2014 | Greenwell |
| 2014/0050626 A1 | 2/2014 | Heidenreich |
| 2014/0234188 A1* | 8/2014 | Hartland ............ B01D 53/9477 423/212 |

FOREIGN PATENT DOCUMENTS

| | | |
|---|---|---|
| JP | 2008-121602 A | 5/2008 |
| JP | 2009-068341 A | 4/2009 |
| JP | 2010-048131 A | 3/2010 |
| JP | 2013-500857 A | 1/2013 |
| JP | 2014-39925 A | 3/2014 |
| JP | 2014-136174 A | 7/2014 |
| JP | 2014-148924 A | 8/2014 |
| JP | 2015-521245 A | 7/2015 |

* cited by examiner

EXHAUST PURIFICATION SYSTEM OF INTERNAL COMBUSTION ENGINE

BACKGROUND ART

Conventionally, for the gasoline engines equipped to automobiles or the like, direct injection gasoline engines have been employed from the viewpoint of an improvement in fuel efficiency, etc. However, in such direct injection gasoline engines, particulate matter (hereinafter referred to as "PM") is produced; therefore, investigation has progressed for technology providing an exhaust purification filter (Gasoline Particulate Filter (hereinafter abbreviation of "GPF" may be used)) which captures PM in the exhaust passage of the gasoline engine, accompanying the strengthening of emission regulations in recent years.

In addition, in the exhaust passage of gasoline engines, in order to purify CO, HC and NOx contained in the exhaust, a catalytic converter configured by loading a three-way catalyst (hereinafter, abbreviation of "TWC" may be used) onto a honeycomb support body has been provided. In particular, a plurality of catalytic converters for satisfying the required purification performance has been arranged in series in the exhaust passage in recent years. For this reason, newly providing a GPF to the exhaust passage in addition to this plurality of catalytic converters is not preferable from the viewpoint of pressure loss and cost.

Therefore, technology has been proposed of imparting three-way catalyst function by the TWC in addition to the PM capturing function possessed by a filter substrate, by way of loading the TWC onto the filter substrate of the GPF (for example, refer to Patent Document 1). According to this technology, it is anticipated as being possible to eliminate the problems of pressure loss and cost, by integrating the GPF and TWC. In other words, by imparting the functions of TWC to the GPF, since it is possible to reduce the number of catalytic converters that should be provided in the exhaust passage by this amount, it is possible to suppress an increase in pressure loss and cost in the exhaust purification system overall, and thus is logical.

Patent Document 1: Japanese Unexamined Patent Application (Translation of PCT Application), Publication No. 2013-500857

Herein, the challenges of an exhaust purification system established by arranging a catalytic converter and GPF in the exhaust passage in series will be considered in detail. So long as imparting the TWC functions to the GPF in the aforementioned way, it is anticipated as being possible to reduce the number of TWCs required for achieving the exhaust purification performance required by this amount. However, in order to ensure the PM capturing function in the filter substrate used in the GPF, contrary to the honeycomb support used in the catalytic converter, sealing is provided thereto. For this reason, even if TWC is not loaded, the pressure loss is high, and the filter substrate of the GPF cannot support as much TWC as the honeycomb support. In other words, the GPF to which the TWC functions are imparted cannot simply become a replacement for a catalytic converter. Therefore, with the exhaust purification system established by arranging a catalytic converter and GPF in series, when trying to ensure the exhaust purification performance of the overall system, it cannot be avoided to load a great amount of TWC onto the filter substrate of the GPF, and the increase in pressure loss of the overall system when doing so is a concern.

When trying to load TWC onto the filter substrate of the GPF in this way, the coexistence of pressure loss and exhaust purification performance is difficult. For this reason, the development of a TWC suited to the filter substrate has been desired. For example, with the technology of Patent Document 1, the NOx purification performance may greatly decline in particular in the case of using TWC containing Rh as the catalytic metal. For example, technology having a two-layer structure of an Rh layer and Pd layer as the TWC having superior three-way purification function has been known; however, it leads to great pressure loss when loading TWC of such as two-layer structure onto the filter substrate of the GPF. For this reason, it has been considered to load TWC of a single-layer structure obtained by mixing Rh and Pd on the filter substrate. However, in this case, Ba which is normally added to the Pd layer for the Pd deterioration suppression and improvement in NOx absorption performance will contact or be in proximity to Rh. Given this, Rh is oxidized to form an oxide by the electron-donating action of Ba, and as a result of the NOx reducibility of Rh declining, there is a problem in that a NOx purification performance as much as the GPF cannot be achieved.

The present invention has been made taking the above into account, and an object thereof is to provide an exhaust purification system of an internal combustion engine which can exhibit superior exhaust purification performance, while suppressing an increase in the pressure loss of the overall system, in an exhaust purification system established by arranging a catalytic converter and GPF in the exhaust passage in series.

DISCLOSURE OF THE INVENTION

An exhaust purification system (for example, the exhaust purification system 2 described later) of an internal combustion engine (for example, the engine 1 described later) according to a first aspect of the present invention includes: a first air/fuel ratio sensor (for example, the LAF sensor 51 described later) that is provided in an exhaust passage (for example, the exhaust pipe 3 described later) of the internal combustion engine, and generates a signal according to the air/fuel ratio of exhaust gas; an upstream catalytic converter (for example, the upstream catalytic converter 31 described later) that is provided on a downstream side of a detection location of the first air/fuel ratio sensor in the exhaust passage, and has a catalyst for purifying the exhaust gas; a second air/fuel ratio sensor (for example, the $O_2$ sensor 52 described later) that is provided on a downstream side of the upstream catalytic converter in the exhaust passage, and generates a signal according to the air/fuel ratio of the exhaust gas; a downstream filter (for example, the GPF 32 described later) that is provided on a downstream side of a detection location of the second air/fuel ratio sensor in the exhaust passage, and purifies by capturing particulate matter in the exhaust gas; and an air/fuel ratio controller (for example, the ECU 6 described later) that manipulates the air/fuel ratio of a mixture to be combusted in the internal combustion engine so that the air/fuel ratio of exhaust gas flowing into the downstream filter converges to a post-stage target value set to the vicinity of a stoichiometric ratio (i.e. theoretical mixture ratio for complete combustion reaction), using an output signal of the first air/fuel ratio sensor and an output signal of the second air/fuel ratio sensor. The downstream filter includes: a filter substrate in which a plurality of cells extending from an inlet-side end face until an outlet-side end face of exhaust gas are formed to be divided by porous barrier walls, and an opening at the inlet-side end face and an opening at the outlet-side end face of the cells are alternately sealed; and a downstream three-way catalyst (for example, the TWC 33, 33*a*, 33*b* described later) that is loaded on the barrier walls; the downstream three-way catalyst contains a catalytic metal including at least Rh, and an OSC material having oxygen occlusion/release ability; the OSC material of the downstream three-way catalyst contains a complex oxide having Nd and Pr in the crystalline structure thereof; the upstream catalytic converter includes a honeycomb substrate in which a plurality of cells extending from an inlet-side end face to an outlet-side end face of exhaust gas is formed to be divided by porous barrier walls, and an upstream three-way catalyst loaded on the barrier walls of the honeycomb substrate; the upstream three-way catalyst contains a catalytic metal and an OSC material having oxygen occlusion/release ability; and the content of OSC material per unit volume of the filter substrate is less than the content of OSC material per unit volume of the honeycomb substrate.

According to a second aspect of the present invention, in this case, it is preferable for the air/fuel ratio controller to include: a pre-stage air/fuel ratio setting means for setting a pre-stage target value relative to the output signal of the first air/fuel ratio sensor so that the output signal of the second air/fuel ratio sensor converges to the post-stage target value; and a manipulated variable determination means for determining an manipulated variable for manipulating the air/fuel ratio of the mixture to be combusted in the internal combustion engine, so that the output signal of the first air/fuel ratio sensor reaches the pre-stage target value.

According to a third aspect of the present invention, in this case, it is preferable for the thickness of the barrier walls of the filter substrate to be larger than the thickness of the barrier walls of the honeycomb substrate, the porosity of the barrier walls of the filter substrate to be higher than the porosity of the barrier walls of the honeycomb substrate, and a total number of cells formed in the filter substrate to be smaller than a total number of cells formed in the honeycomb substrate.

According to a fourth aspect of the present invention, in this case, it is preferable for the barrier walls of the filter substrate to have an average pore diameter of at least 15 μm, and the downstream three-way catalyst to have a particle size D90 when a cumulative distribution from a small particle size side of the particle distribution is 90% of no more than 5 μm.

According to a fifth aspect of the present invention, in this case, it is preferable for the downstream three-way catalyst to contain Rh and Pd as the catalytic metal, and be loaded on surfaces inside pores within the barrier walls of the filter substrate in a state in which Rh and Pd is mixed.

According to a sixth aspect of the present invention, in this case, it is preferable for the downstream three-way catalytic converter to be constituted to be free of Ba.

According to a seventh aspect of the present invention, in this case, it is preferable for the total content of Nd and Pr contained in the complex oxide of the downstream three-way catalyst to be at least 10% by mass.

Effects of the Invention

With the first aspect of the present invention, in A so-called wall-flow type GPF which captures particulate matter in exhaust gas by having the exhaust pass through porous barrier walls, a downstream three-way catalyst loaded on the barrier walls is configured to include a catalytic metal at least containing Rh, and a material containing a complex oxide having Nd and Pr in the crystalline structure as an OSC material having oxygen occlusion/release ability (Oxygen Storage Capacity). Herein, among elements capable of being incorporated in the crystalline structure of the complex oxide having oxygen occlusion/release ability, Nd and Pr have a characteristic of a large amount of acid sites as described in detail later. For this reason, the complex oxide having Nd and Pr in the crystalline structure has high HC absorbability due to the large amount of acid sites, and thus the steam-reforming reaction which progresses under the existence of HC and water, advances efficiently. Given this, hydrogen is generated by the advancement of this steam-reforming reaction, and the oxide formation of Rh constituting the downstream three-way catalyst is suppressed by the generated hydrogen. In other words, since it is possible to avoid a decline in the NOx reducibility of Rh, high NOx purification performance can be exhibited. Therefore, with the present invention, it is possible to suppress an increase in pressure loss in the GPF while exhibiting sufficient three-way purification performance, by using the downstream three-way catalyst capable of exhibiting superior three-way purification performance in the filter substrate of the downstream filter.

Herein, OSC material for suppressing fluctuations in air/fuel ratio is generally contained in the three-way catalyst, in addition to the catalytic metal for exhibiting the three-way purification performance. For this reason, in order to best suppress an increase in pressure loss in the downstream filter, it is preferable to make the content of OSC material per unit volume of the filter substrate of the downstream filter less than the content of OSC material per unit volume of the honeycomb substrate of the upstream catalytic converter. In this regard, although the generated amount of hydrogen by the steam-reforming reaction is higher for Nd than Pr as described later, Pr has an effect of absorbing fluctuations in the air/fuel ratio. Therefore, it is possible to reduce the content of OSC material in the filter substrate, while exhibiting high three-way purification performance, as well as suppressing fluctuations in the air/fuel ratio, by using a material containing complex oxide having Nd and Pr in the crystalline substrate, as the OSC material contained in the TWC 33 used in the GPF 32. In the above way, upon using the downstream three-way catalyst which is suited to the filter substrate, the present invention can exhibit superior exhaust purification performance, while suppressing an increase in pressure loss in the overall system, by making the content of OSC material in the downstream filter even less than the upstream catalytic converter.

In addition thereto, the present invention uses the output signals of the first air/fuel ratio sensor and second air/fuel ratio sensor which are provided on the upstream sides of the upstream catalytic converter and downstream filter, respectively, in order to avoid a decline in the three-way purification performance of the downstream filter caused by decreasing the content of OSC material used in the downstream filter, and then manipulates the air/fuel ratio of the mixture to be combusted in the internal combustion engine so that the air/fuel ratio of exhaust gas flowing into the downstream filter converges to the post-stage target value set in the vicinity of a stoichiometric ratio. First, with the present invention, a greater amount of OSC material than the downstream filter is provided to the upstream catalytic converter. For this reason, fluctuations in the air/fuel ratio are suppressed in the course of passing through the upstream catalytic converter; therefore, it is possible to stabilize the air/fuel ratio of exhaust gas flowing into the downstream filter. In this way, with the present invention, it is possible to achieve both suppression of pressure loss due to decreasing the content of OSC material in the downstream filter and improve the exhaust purification performance, by stabilizing the air/fuel ratio of exhaust gas flowing into the downstream filter by appropriately distributing the content of OSC material to the upstream catalytic converter and the downstream filter, and then further using the two air/fuel ratio sensors, and manipulating the air/fuel ratio of the mixture so as to converge the mixture of exhaust gas in the downstream filter to the post-stage target value set in the vicinity of a stoichiometric ratio.

With the second aspect of the present invention, the pre-stage target value relative to the output signal of the first air/fuel ratio sensor on the upstream side of the upstream catalytic converter is set so that the output signal of the second air/fuel ratio sensor converges to the post-stage target value set in the vicinity of a stoichiometric ratio. Then, the manipulated variable for manipulating the air/fuel ratio of the mixture to be combusted in the internal combustion engine is determined so that the output signal of the first air/fuel ratio sensor reaches the pre-stage target value. It is thereby possible to set the pre-stage target value taking into account the response lag, dead time, etc. of the control system from the output signal of the first air/fuel ratio sensor at the upstream catalytic converter until the output signal of the second air/fuel ratio sensor, so that the air/fuel ratio of exhaust gas flowing into the downstream filter converges to the post-stage target value set in the vicinity of a stoichiometric ratio, i.e. so that the three-way purification performance of the downstream three-way catalyst continues to be exhibited.

Regarding the third aspect, FIG. 17 is a graph showing the relationships of the wall thickness, porosity and cell number, which are parameters characterizing the filter substrate of the downstream filter, with the PM capturing function, pressure loss performance, etc. by the downstream filter. First, with the present invention, the thickness of the barrier wall in the filter substrate is made larger than the thickness of the honeycomb substrate. It is thereby possible to achieve a PM capturing function to the extent required in the downstream filter. However, as shown in FIG. 17, although the PM capturing function improves when thickening the barrier wall of the filter substrate, the pressure loss will increase. Therefore, with the present invention, the porosity of the barrier walls in the filter substrate is made higher than the porosity of the barrier walls in the honeycomb substrate. It is thereby possible to suppress an increase in pressure loss of the downstream filter. However, when raising the porosity, the mechanical strength of the filter substrate will decline as shown in FIG. 17. Therefore, in order to ensure sufficient mechanical strength to the filter substrate, the porosity cannot be excessively increased, and thus the pressure loss cannot be sufficiently reduced. Therefore, in the present invention, the total number of cells formed in the barrier wall of the filter substrate is made less than the total number of cells formed in the honeycomb substrate. With the present invention, it is possible to achieve sufficient PM capturing function, mechanical strength and pressure loss performance, by setting the wall thickness, porosity and cell number in the above way.

The fourth aspect of the present invention micronizes with the average pore diameter of the barrier wall of the filter substrate set to at least 15 µm, and the particle size D90 of the downstream three-way catalyst set to no more than 5 µm. It is thereby possible to introduce the micronized downstream three-way catalyst within the pores of the barrier wall, and possible to load the downstream three-way catalyst on the surfaces inside such pores. Therefore, according to the present invention, it is possible to avoid an increase in the pressure loss of the downstream filter occurring from the downstream three-way catalyst being loaded only on the surface of the barrier wall, and moreover, possible to exhibit higher three-way purification performance.

With the fifth aspect of the present invention, the downstream three-way catalyst is configured to contain Rh and Pd, and is loaded onto the surfaces inside the pores within the barrier wall of the filter substrate in a state mixing this Rh and Pd. Conventionally, in the case of mixing Rh and Pd on the downstream filter as mentioned above, as a result of Ba which is conventionally added to the Pd layer either contacting or being near Rh, the Rh is oxidized to form an oxide by the electron donating action of Ba, whereby the NOx purification performance greatly declines. In contrast, according to the present invention, as a result of the effect of the first aspect of the invention being remarkably exhibited, it is possible to avoid a decline in the NOx purification performance of Rh, and thus possible to provide the downstream filter that can exhibit superior three-way purification function to conventional. In addition, since it is difficult to load conventional downstream three-way catalyst having a two-layer structure of the Rh layer and Pd layer on the surfaces inside the pores of the barrier wall, and further, high three-way purification performance is exhibited in the state mixing Rh and Pd according to the present invention, it becomes a catalyst composition preferred in the loading onto the surfaces within pores of the barrier wall.

The sixth aspect of the present invention configured the downstream three-way catalyst to be free of Ba. Since Ba is not contained in the downstream three-way catalyst, it is thereby possible to avoid oxide formation of Rh due to Ba from progressing as mentioned above, and the NOx purification performance from declining.

The seventh aspect of the present invention establishes a configuration in which Nd and Pr are contained in at least 10% by mass in the crystalline structure of the complex oxide. A more superior three-way purification performance is thereby exhibited.

PREFERRED MODE FOR CARRYING OUT THE INVENTION

Figure 1:
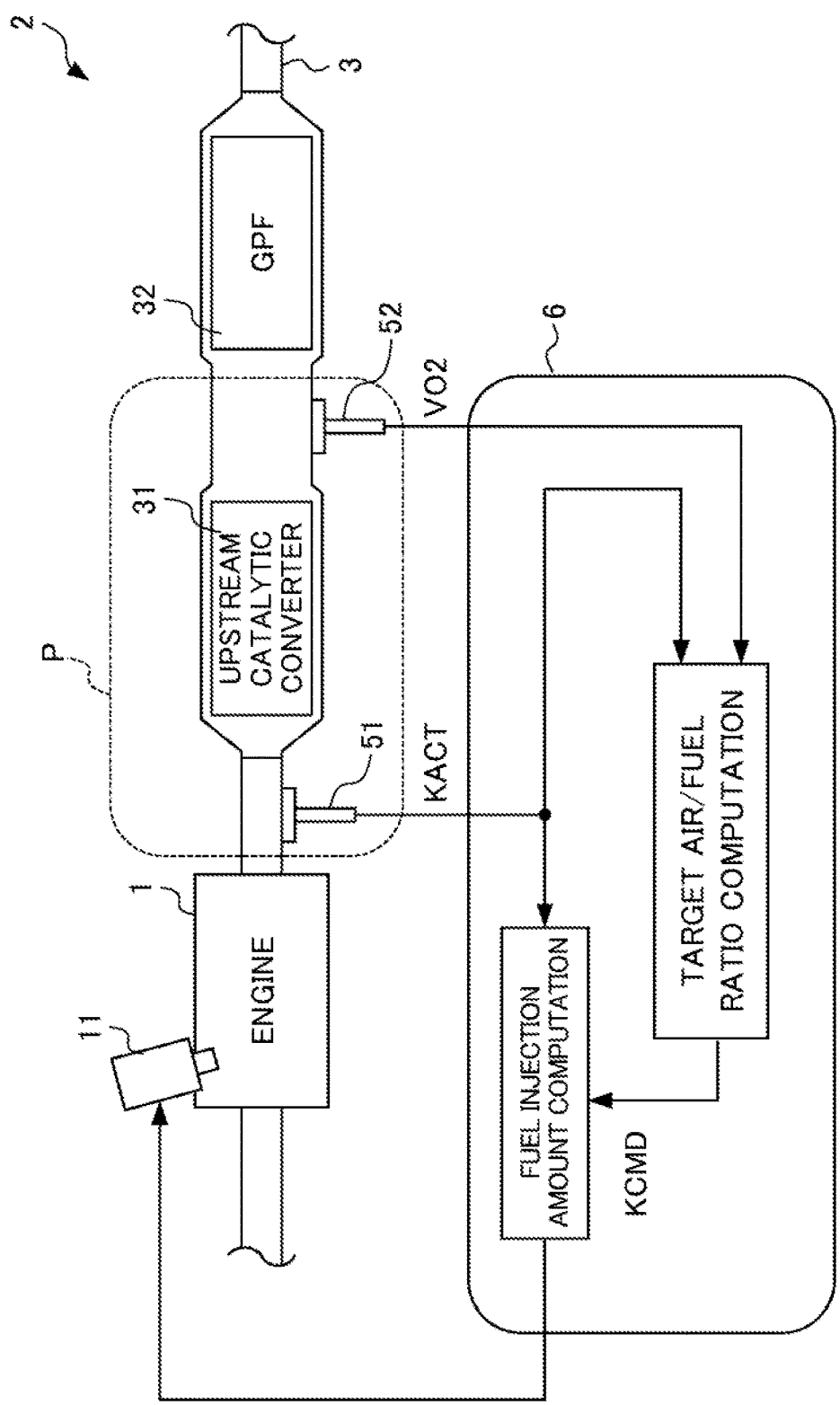
FIG. 1 is a view showing the configuration of an exhaust purification system of an engine according to an embodiment of the present invention.

Hereinafter, an embodiment of the present invention will be explained by referencing the drawings. FIG. 1 is a view showing the configuration of an internal combustion engine (hereinafter referred to as "engine") 1 and an exhaust purification system 2 thereof according to the present embodiment.

The engine 1 is a direct injection-type gasoline engine that injects fuel directly into each cylinder by way of fuel injectors 11 provided to each of the plurality of cylinders. These fuel injectors 11 operate according to signals from an ECU 6 described later. The ECU 6 determines the fuel injection state such as fuel injection amount and fuel injection period of these fuel injectors 11 according to an air/fuel ratio control program described later, as well as driving the fuel injectors 11 to open and close so that the determined fuel injection state is realized.

The exhaust purification system 2 includes: an LAF sensor 51 serving as a first air/fuel ratio sensor; an upstream catalytic converter 31 provided in an exhaust pipe 3 of the engine 1; an $O_2$ sensor 52 serving as a second air/fuel ratio sensor; a GPF 32 serving as a downstream filter provided in the exhaust pipe 3; and the ECU 6 serving as an air/fuel ratio controller that manipulates the air/fuel ratio of the mixture to be combusted in the engine 1 using the output signals of the LAF sensor 51 and $O_2$ sensor 52, and thereby purifies the exhaust gas of the engine 1 flowing through the exhaust pipe 3. Hereinafter, after first explaining the configurations of the upstream catalytic converter 31 and the GPF 32, the functions of the two sensors 51, 52 and the ECU 6 will be explained.

The upstream catalytic converter 31 includes: a honeycomb substrate in which a plurality of cells extending from an inlet-side end face to an outlet-side end face of exhaust gas are formed to be demarcated by porous barrier walls, and a TWC loaded on the barrier walls of this honeycomb substrate. The TWC used in the upstream catalytic converter 31 has a function of purifying, by oxidizing or reducing HC in the exhaust gas into $H_2O$ and $CO_2$, CO into $CO_2$, and NOx into $N_2$, respectively (i.e. three-way purifying function). In this TWC, a catalyst made by loading noble metals such as Pd and Rh as catalytic metals onto a carrier consisting of oxides such as alumina, silica, zirconia, titania, ceria and zeolites is used.

The TWC of the upstream catalytic converter 31 contains OSC material having an oxygen occlusion/release ability. As the OSC material, other than $CeO_2$, a complex oxide of $CeO_2$ and $ZrO_2$ (hereinafter referred to as "CeZr complex oxide") or the like is used. Thereamong, CeZr complex oxide is preferably used due to having high durability. It should be noted that the above-mentioned catalytic metals may be loaded on these OSC materials.

The production method of the upstream catalytic converter 31 is not particularly limited, and is prepared by a conventionally known slurry method or the like. For example, after preparing a slurry containing the above-mentioned oxides, noble metal, OSC material, etc., it is produced by coating the prepared slurry on a honeycomb substrate made of cordierite and firing.

The GPF 32 is provided on a downstream side of the upstream catalytic converter 31 in the exhaust pipe 3. The GPF 32 captures and purifies PM in the exhaust gas. More specifically, upon exhaust gas passing through the fine pores in the barrier walls described later, PM is captured by the PM depositing on the surfaces of the barrier walls.

Figure 2:
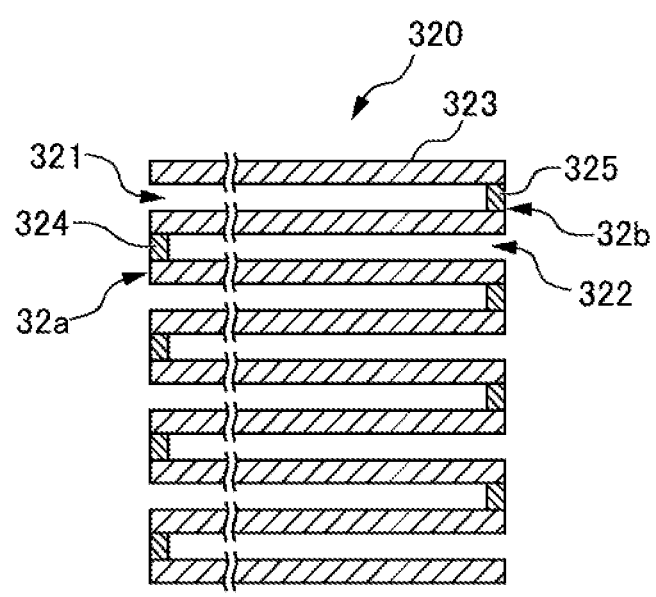
FIG. 2 is a cross-sectional schematic diagram of a GPF according to the embodiment.

FIG. 2 is a cross-sectional schematic diagram of the GPF 32 according to the present embodiment. As shown in FIG. 2, the GPF 32 includes a filter substrate 320. The filter substrate 320 is a columnar shape that is long in the axial direction, for example, and is formed from a porous body such as cordierite, mullite, silicon carbide (SiC) or the like. A plurality of cells extending from the inlet-side end face 32a to the outlet-side end face 32b is provided in the filter substrate 320, and these cells are formed to be divided by barrier walls 323.

The filter substrate 320 includes inlet-side sealed parts 324 which seal the inlet-side end face 32a. The cells in which the inlet-side end face 32a is sealed by the inlet-side sealing part 324 constitute outlet-side cells 322 in which the inlet-side end face is closed, while the outlet-side end is opened, and exhaust gas having passed through the barrier wall 323 flows out to downstream. The inlet-side sealing parts 324 are formed by filling sealing cement from the inlet-side end face 32a of the filter substrate 320.

The filter substrate 320 includes outlet-side sealing parts 325 which seal the outlet-side end face 32b. The cells in which the outlet-side end face 32b is sealed by the outlet-side sealing part 325 constitute inlet-side cells 321 in which the inlet-side end is opened, while the outlet-side end is closed, and exhaust gas flows in from the exhaust pipe 3. The outlet-side sealing parts 325 are formed by filling sealing cement from the outlet-side end face 32b of the filter substrate 320.

It should be noted that the opening on the inlet-side end face 32a of a cell and the opening on the outlet-side end face 32b are alternately sealed, whereby the above-mentioned inlet-side cells 321 and outlet-side cells 322 will be arranged adjacently in a lattice shape (checkered pattern) to each other.

Figure 3:
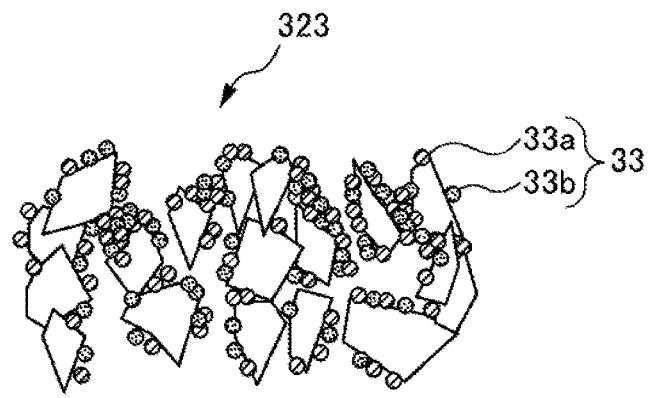
FIG. 3 is an enlarged schematic diagram of a barrier wall in the GPF according to the embodiment.

FIG. 3 is an enlarged schematic diagram of the barrier wall 323 of the GPF 32 according to the present embodiment. As shown in FIG. 3, the TWC 33 is loaded on the inner surface of pores within the barrier wall 323. The TWC 33 is configured to include a TWC 33a containing Rh and a TWC 33b containing Pd. These TWCs 33 are loaded on the surfaces inside pores in an atomized state. It should be noted that the pores of the barrier wall 323 are not blocked by these TWCs 33, and are made so that a large pressure loss does not occur.

The barrier wall 323 preferably has an average pore diameter of at least 15 μm. So long as the average pore diameter is at least 15 μm, with relation to the particle size of the TWC 33 described later, it is possible for the TWC 33 to penetrate inside the pore diameter, and thus the TWC 33 can be loaded on the surfaces inside of the pores. A more preferable average pore diameter is at least 20 μm.

In addition, although the thickness of the barrier wall 323 is not particularly limited, it is preferably no more than 10 mil. In the case of the thickness of the barrier wall exceeding 10 mil, the pressure loss may increase in relation to the loading amount of TWC and average pore diameter of the barrier wall, etc.

The TWC 33 is atomized to have a particle size D90 of no more than 5 μm when the cumulative probability distribution from the small grain size side of the grain distribution reaches 90%. So long as the D90 of TWC 33 is no more than 5 μm, with relation to the average pore diameter of the aforementioned barrier wall 323, it is possible for the TWC 33 to penetrate into the pore diameter, whereby the TWC 33 can be loaded on the surfaces inside the pores. A more preferably D90 is no more than 3 μm.

The TWC 33 contains at least Rh as the catalytic metal, and preferably contains Rh and Pd as the catalytic metal as shown in FIG. 3. This Rh and Pd may be loaded on the OSC material having the oxygen occlusion/release ability described later, and may be loaded onto a conventionally known carrier consisting of oxides such as alumina, silica, zirconia, titania, ceria and zeolites.

The TWC 33 is configured to include the TWC 33a containing Rh and the TWC 33b containing Pd as mentioned above. As shown in FIG. 3, the TWC 33a containing Rh and the TWC 33b containing Pd are loaded onto the surfaces inside of the pores within the barrier wall 323 in a mixed state.

In addition, the TWC 33 contains the OSC material having oxygen occlusion/release ability, in addition to the aforementioned such catalytic metals. Then, materials containing complex oxides having Nd and Pr in the crystalline structure thereof are used in the OSC material used in this TWC 33. It should be noted that, in addition to such a complex oxide having Nd and Pr, an existing material having oxygen occlusion/release ability such as $CeO_2$, $ZrO_2$ and complex oxides of these may be used as the OSC material used in the TWC 33.

In the present embodiment, the complex oxide used as the OSC material along with the catalytic metal is loaded into the barrier wall 323. The TWC used in the upstream catalytic converter 31 and GPF 32 has a function of oxidizing HC in the exhaust gas of each to convert to $CO_2$ and $H_2O$, oxidizing the CO to convert to $CO_2$, while reducing the $NO_x$ to $N_2$. In order to effectively produce the catalytic actions in both of these reactions simultaneously, it is preferable to keep the ratio of fuel to air close to a stoichiometric ratio.

The air/fuel ratio in the internal combustion engine of an automobile or the like greatly varies according to the operating conditions. For this reason, the ECU 6 controls so as to keep the air/fuel ratio of exhaust gas flowing into the upstream catalytic converter 31 and GPF 32 at near a stoichiometric ratio by performing the air/fuel ratio control described later. However, it is not sufficient for the catalyst to exhibit purification performance by simply controlling the air/fuel ratio by such a method. Therefore, the OSC material having an oxygen occlusion/release ability of occluding oxygen under an oxidizing atmosphere and releasing oxygen under a reducing atmosphere is used along with the catalytic metal as a co-catalyst. For example, $CeO_2$, a complex oxide of Ce and Zr, or the like are known as OSC materials.

In the complex oxide used as the OSC material in the present embodiment, a structure is assumed in which a part of the Ce and/or Zr in the crystalline structure of $CeO_2$ and/or $ZrO_2$ is substituted with Nd, Pr. Nd and Pr have high HC absorbability, and the generated amount of hydrogen by way of the steam-reforming reaction described later is great. The hydrogen promotes reduction of Rh, and raises the $NO_x$ purification performance of Rh.

In the present embodiment, in addition to Nd, the Pr which has a smaller generated amount of hydrogen by way of the steam reforming reaction than Nd, is also contained in the structure of the complex oxide. Since Pr has a function of absorbing the fluctuations in the air/fuel ratio relative to a stoichiometric ratio, it facilitates the air/fuel ratio being kept near a stoichiometric ratio by Pr being contained.

The CeZrNdPr complex oxide according to the present embodiment can be prepared by the following method, for example. First, cerium nitrate, zirconium nitrate, neodymium nitrate and praseodymium nitrate are dissolved in purified water so as to make the desired ratios. Subsequently, a precipitate is obtained by adding drop-wise a sodium hydroxide aqueous solution to make the pH of the solvent to be 10, for example. Subsequently, the solvent is evaporated by vacuum filtrating in a state heating the solution containing the precipitate to 60° C., for example. Next, after extracting residue, the CeZrNdPr complex oxide is obtained by performing calcination for 2 hours at 500° C., for example.

In addition, the TWC 33 of the present embodiment is configured to be free of Ba, which had been conventionally added from the viewpoint of Pd deterioration suppression and improvement in NOx absorbability.

In the TWC 33 of the present embodiment, the total content of Nd and Pr contained in the complex oxide is preferably at least 10% by mass. So long as the total content of Nd and Pr contained in the complex oxide is within this range, higher three-way purification function will be exhibited. The upper limit for this total content is preferably 20% by mass, and a more preferable range is 12% by mass to 16% by mass.

The content ratio of Rh to Pd in the TWC 33 is not particularly limited; however, it is preferably Rh:Pd=1: 10~1:5 by mass basis.

In addition, the loading amount (hereinafter referred to as "washcoat amount") of TWC 33 per unit volume of the filter substrate 320 of the GPF 32 is not particularly limited; however, it is preferably 40 to 80 g/L. In the case of the washcoat amount being less than 40 g/L, sufficient purification performance will not be obtained, and in the case of exceeding 80 g/L, the pressure loss will increase.

It should be noted that, in the present embodiment, another noble metal, e.g. Pt, may be contained as a catalytic metal in the TWC 33. In addition, catalysts having functions other than the three-way purification function, e.g., NOx catalyst or oxidation catalyst, Ag-based catalyst for combustive removal of PM deposited in the GPF, and the like may be loaded within the barrier wall or on the barrier wall surface.

Next, the production method of the GPF 32 according to the present embodiment will be explained. The GPF 32 according to the present embodiment is produced by a dipping method, for example. With the dipping method, for example, a slurry containing predetermined amounts of the constituent materials of the TWC 33 is created by wet pulverization or the like, the GPF 32 is immersed in the created slurry, followed by pulling the GPF 32 out and firing at predetermined temperature conditions, whereby it is possible to load the TWC 33 on the GPF 32.

In the present embodiment, it is preferable to pulverize the slurry created by mixing catalysts such as Rh and Pd in a ball mill or the like until the particle size is no more than 5 μm, and then immerse the GPF 32 one time. It is thereby possible to load Rh and Pd in a state randomly mixed on the surfaces inside of pores within the barrier wall 323.

Figure 4:
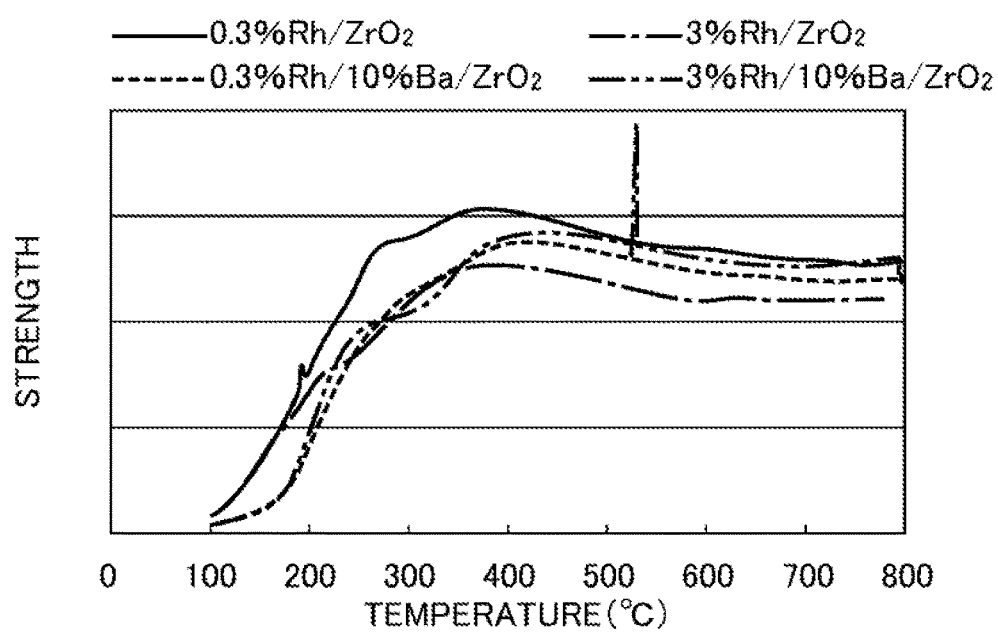
FIG. 4 is a graph showing the ease of reduction of Rh by way of CO-TPR.

Next, the reason for the TWC according to the present embodiment not containing Ba being preferable will be explained by referencing FIG. 4. FIG. 4 is a graph showing the ease of reducing Rh by CO-TPR. More specifically, it is a graph showing the results of measuring the ease of reducing Rh by way of CO-TPR (temperature-programmed-reduction technique) according to the following sequence, due to the existence/absence of Ba added to the TWC. TWCs were measured which had been created by loading Rh onto Zr oxide in proportions of 0.3% by mass and 3% by mass, respectively, and adding 10% by mass of Ba thereto, or not adding thereto.

(CO-TPR Measurement Sequence)
(1) Heat in He, and hold at 600° C. for 10 minutes
(2) Lower temperature to 100° C.
(3) Heat in 1% $CO/N_2$ up to 800° C. at 10° C./min, and reduce Rh
(4) Lower temperature to 600° C.
(5) Hold in 10% $O_2/N_2$ at 600° C. for 10 minutes
(6) Lower temperature to 100° C., hold in He for 10 minutes, followed by holding in 1% CO/Ne for 10 minutes
(7) Heat to 800° C. at 10° C./min in 1% $CO/N_2$, and measure change due to temperature in $CO_2$ release As shown in FIG. 4, it is understood that the TWC containing Ba has a small $CO_2$ release amount at low temperature compared to TWC free of Ba. This is considered to mean that Rh is hardly reduced, and Ba inhibits the reduction of Rh. Therefore, the TWC of the present embodiment maintains the reduced state of Rh by not containing Ba, and thus high $NO_x$ purification performance is exhibited.

Figure 5:
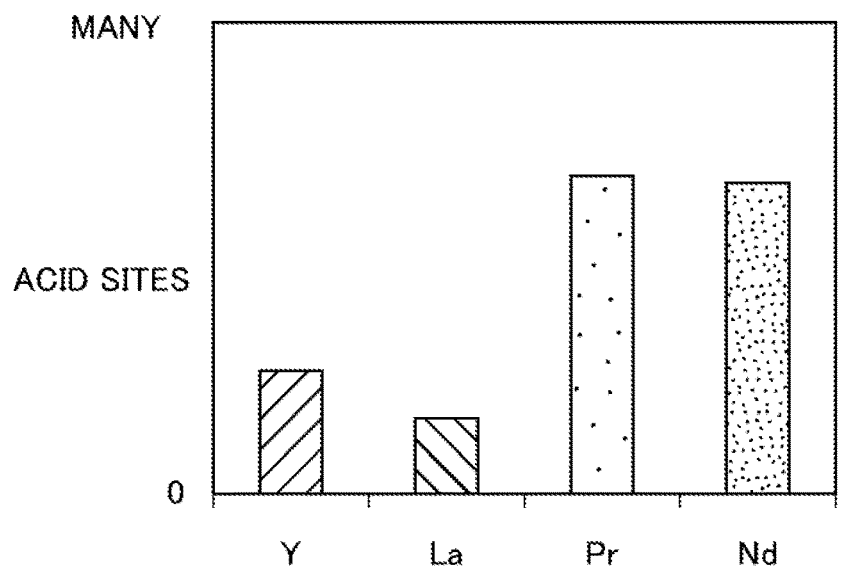
FIG. 5 is a chart showing the amount of acid sites in each complex oxide by way of $NH_3$-TPD.

Next, the actions according to the CeZrNdPr complex oxide will be explained. For the Rh used as the catalytic metal, the reduced state is maintained under the presence of hydrogen, whereby the $NO_x$ purification performance rises. For this reason, in the present embodiment, the steam reforming reaction is employed. The steam reforming reaction is a reaction such as the following equation in which steam and HC react at high temperature under the presence of catalyst and hydrogen is produced. $C_nH_m + nH_2O \rightarrow nCO + (n+½m)H_2$ In order to raise the generated amount of hydrogen by the steam reforming reaction, HC absorbability is important, and the HC absorbability is considered to depend on the acid sites. FIG. 5 is a graph showing the amount of acid sites of each complex oxide according to $NH_3$-TPD. More specifically, it is a graph showing the results of measuring the amounts of the acid sites for Y, La, Pr and Nd, respectively, which are exemplified as elements which can be contained in the crystalline structure of the complex oxides of Ce and/or Zr, by way of the following sequence by $NH_3$-TPD (temperature-programmed-reduction technique).

($NH_3$-TPD Measurement Sequence)
(1) Heat in He, and hold at 600° C. for 60 minutes
(2) Lower temperature to 100° C.
(3) After holding for 60 minutes in 0.1% $NH_3$/He, hold for 60 minutes in He
(4) Heat to 600° C. at 10° C./min in He As shown in FIG. 5, Nd and Pr are found to have more acid sites than Y and La. Therefore, based on these results, Nd and Pr are considered to have high HC absorbability.

Figure 6:
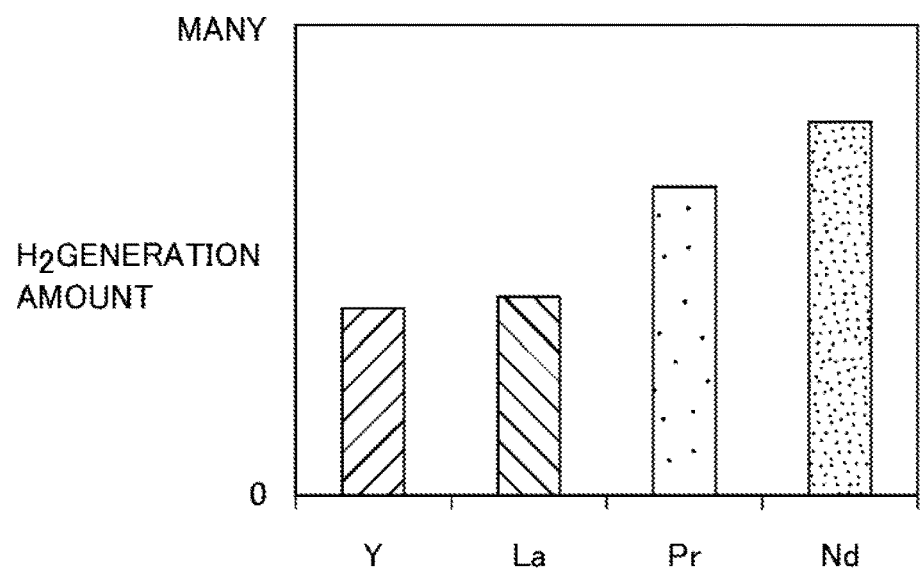
FIG. 6 is a chart showing a hydrogen generation amount by steam-reforming reaction of each complex oxide.

FIG. 6 is a graph comparing the generated amount of hydrogen by the steam reforming reaction at 500° C., in the case of containing each element of Y, La, Pr and Nd in the crystalline structure of CeZr complex oxide. It should be noted that the contents of the respective elements of Y, La, Pr and Nd at this time are 7% by mass, the content of Ce is 41% by mass, and the contents of Zr is 52% by mass. As shown in FIG. 6, Pr and Nd are found to have greater generated amounts of hydrogen than Y and La.

Returning to FIG. 1, a preferred combination of the upstream catalytic converter 31 and GPF 32 provided to the exhaust pipe 3 will be explained. The upstream catalytic converter 31 and GPF 32 share the point of being configured by loading TWC constituted to contain the catalytic metal which produces the three-way purifying function and the OSC material having oxygen occlusion/release ability, onto a porous substrate, as mentioned above. Herein, the substrate and TWC used in the upstream catalytic converter 31 are not limited to the aforementioned example, and may use the same as that used in the GPF 32. However, when considering that the air/fuel ratio in the GPF 32 on the downstream side of the $O_2$ sensor is stably controlled to near a stoichiometric ratio under the air/fuel ratio control by the ECU 6, the content of OSC material in the upstream catalytic converter 31 and GPF 32 (more specifically, content (g/L) of OSC material per unit volume of substrate), loading amount of three-way catalyst (more specifically, loading amount (g/L of three-way catalyst per unit volume of substrate), cell structure of substrate, and porosity of the substrate are preferably combined so as to satisfy the following table.

TABLE 1

| | Upstream Catalytic Converter | GPF |
| --- | --- | --- |
| Content of OSC material (g/L) | Large | Small |
| Loading amount of catalyst (g/L) | Large | Small |
| Cell structure (cell number/wall thickness) | 600/3.5 | 300/8 |
| Porosity (%) | 35 | 65 |

For example, as shown in the above table, the content of OSC material per unit volume of the filter substrate of the GPF 32 is preferably less than the content of OSC material per unit volume of the honeycomb substrate of the upstream catalytic converter 31. More specifically, in the case of setting the content of OSC material in the upstream catalytic converter 31 as 1, the content of OSC material in the GPF 32 is within the range of 1 to 0.3, and more preferably, on the order of 0.35.

In addition, the loading amount (g/L9 of the TWC 33 per unit volume of the filter substrate of the GPF 32 is preferably less than the loading amount (g/L) of TWC per unit volume of the honeycomb substrate of the upstream catalytic converter 31. More specifically, in the case of setting the loading amount of TWC on the upstream catalytic converter 31 as 200 (g/L), the loading amount of the TWC 33 on the GPF 32 is within the range of 50 to 100 (g/L), and more preferably on the order of 60 (g/L), as shown in the Examples described later.

The thickness of the barrier walls of the filter substrate of the GPF 32 is preferably greater than the thickness of the barrier walls of the honeycomb substrate of the upstream catalytic converter 31. More specifically, in the case of setting the wall thickness of the GPF 32 as 8 mil, the wall thickness of the upstream catalytic converter 31 is preferably set as 3.5 mil.

In addition, the porosity of the barrier walls of the filter substrate of the GPF 32 is preferably higher than the porosity of the barrier walls of the honeycomb substrate of the upstream catalytic converter 31. More specifically, in the case of setting the porosity of the GPF 32 as 65%, it is preferable to set the porosity of the upstream catalytic converter 31 to 35%.

The total number of cells formed in the filter substrate of the GPF 32 is preferably less than the total number of cells formed in the honeycomb substrate of the upstream catalytic converter 31. More specifically, in the case of setting the total number of cells in the GPF 32 as 300, the total number of cells in the upstream catalytic converter is preferably set to 600. By configuring the wall thickness, porosity and total number of cells in the above way, it is possible to achieve sufficient PM capturing function, mechanical strength and pressure loss performance in the GPF 32.

Next, the functions of an LAF sensor 51, $O_2$ sensor 52 and ECU 6 will be explained.

The LAF sensor 51 detects the air/fuel ratio of exhaust gas flowing on the upstream side of the upstream catalytic converter 31 in the exhaust pipe 3 (ratio of fuel component to oxygen in exhaust gas), and sends a signal substantially proportional to the detection value to the ECU 6. The $O_2$ sensor 52 detects the oxygen concentration in exhaust gas flowing between the upstream catalytic converter 31 and GPF 32 in the exhaust pipe 3 (i.e. air/fuel ratio), and sends a signal according to the detection value to the ECU 6.

Herein, the characteristics of the output signals of the LAF sensor 51 and $O_2$ sensor 52 will be explained. The LAF sensor 51 generates a signal of a level substantially proportional to the air/fuel ratio over air/fuel ratios of a wider range than the $O_2$ sensor 52. In other words, the level of the signal of the LAF sensor 51 has a linear characteristic from a rich region to a lean region, whereby detection of the air/fuel ratio in a wider range than the $O_2$ sensor 52 is possible. The $O_2$ sensor 52, when the oxygen concentration in the exhaust gas is within the range A in the vicinity of a stoichiometric ratio, generates a signal substantially proportional to the oxygen concentration of the exhaust gas. In other words, the level of the signal outputted from the $O_2$ sensor 52 has a substantially binary characteristic flipping from low to high in the vicinity of a stoichiometric ratio. Therefore, the $O_2$ sensor 52 can detect the air/fuel ratio with higher sensitivity than the LAF sensor 51 in a range limited to the vicinity of a stoichiometric ratio.

The ECU 6 is configured by an input circuit having functions such as of smoothing input signal waveforms from various sensors such as the above-mentioned sensors 51 and 52, correcting the voltage levels to predetermined levels, and converting analog signal values into digital signal values; a drive circuit that drives various devices such as a central arithmetic processing unit that executes various control programs such as air/fuel ratio control explained below, and the fuel injectors 11 of the engine 1 in a mode determined by the control programs; etc.

FIG. 1 schematically shows the sequence of air/fuel ratio control of the ECU 6. The ECU 6 determines the fuel injection amount from the fuel injectors 11, which is the manipulated amount of the air/fuel ratio of the mixture to be combusted in the engine 1, by executing an air/fuel ratio control program consisting of a target air/fuel ratio computation and a fuel injection amount computation using the output signal KACT of the LAF sensor 51 and the output signal $VO_2$ of the $O_2$ sensor.

In the fuel injection amount computation, the ECU 6 determines the fuel injection amount from the fuel injectors 11 using existing feedback control rules such as sliding mode control, so that the output signal KACT of the LAF sensor 51 converges to the target air/fuel ratio KCMD calculated by target air/fuel ratio computation described later.

In the target air/fuel ratio computation, the ECU 6 determines the target air/fuel ratio KCMD by using the output signal KACT of the LAF sensor 51 and the output signal $VO_2$ of the $O_2$ sensor 52, so as to be able to exhibit high three-way purification function in each of the TWC of the upstream catalytic converter 31 and the TWC of the GPF 32. More specifically, in the target air/fuel ratio computation, the ECU 6 determines a target air/fuel ratio KCMD such that achieves the above-mentioned such object, by defining the control system P from the output signal KACT of the LAF sensor 51 to the output signal $VO_2$ of the $O_2$ sensor 52 as a model at least including a response delay element and a dead-time element, and using computations of an adaptive sliding mode controller, real-time identifier, state predictor, etc. explained below.

First, the real-time identifier sequentially generates identity values of a plurality of model parameters defined by the above-mentioned model, by using the output signal KACT of the LAF sensor 51 and the output signal $VO_2$ of the $O_2$ sensor 52. In addition, a state estimator sequentially generates output after the dead time of the above-mentioned control system P, i.e. estimated values after dead time of output signal $VO_2$ of $O_2$ sensor 52. An adaptive sliding mode controller determines the target air/fuel ratio KCMD using the identity value generated by the above-mentioned real-time identifier and the estimated value generated by the state predictor, so that the output signal $VO_2$ of the $O_2$ sensor 52 converges to the predetermined post-stage target value set in the vicinity of a stoichiometric ratio, so that high three-way purification function is exhibited in the TWC 33 of the GPF 32.

It should be noted that, in regards to the details of the algorithm of the air/fuel ratio control of the above such ECU 6, due to being described in Japanese Unexamined Patent Application, Publication No. 2000-230451, Japanese Unexamined Patent Application, Publication No. 2001-182528, etc. by the applicants of the present application, for example, a more detailed explanation than this is omitted herein.

According to the present embodiment, the following effects are exerted. In the present embodiment, in the so-called wall-flow type GPF 32, the TWC 33 loaded on the barrier wall 323 is configured to include a catalytic metal at least containing Rh, and a material containing a complex oxide having Nd and Pr in the crystalline structure as an OSC material having oxygen occlusion/release ability. Herein, among elements capable of being incorporated in the crystalline structure of the complex oxide having oxygen occlusion/release ability, Nd and Pr have a characteristic of a large amount of acid sites. For this reason, the complex oxide having Nd and Pr in the crystalline structure has high HC absorbability due to the large amount of acid sites, and thus the steam-reforming reaction which progresses under the existence of HC and water, advances efficiently. Given this, hydrogen is generated by the advancement of this steam-reforming reaction, and the oxide formation of Rh constituting the TWC 33 is suppressed by the generated hydrogen. In other words, since it is possible to avoid a decline in the NOx reducibility of Rh, high NOx purification performance can be exhibited. Therefore, with the present invention, it is possible to suppress an increase in pressure loss in the GPF while exhibiting sufficient three-way purification performance, by using the TWC 33 capable of exhibiting superior three-way purification performance in the filter substrate of the GPF 32.

The OSC material is contained in the TWC in the aforementioned way. For this reason, in order to best suppress an increase in pressure loss in the GPF 32, it is preferable to make the content of OSC material per unit volume of the filter substrate of the GPF 32 less than the content of OSC material per unit volume of the honeycomb substrate of the upstream catalytic converter 31. In this regard, although the generated amount of hydrogen by the steam-reforming reaction is higher for Nd than Pr as described above, Pr has an effect of absorbing fluctuations in the air/fuel ratio. Therefore, it is possible to reduce the content of OSC material in the filter substrate, while exhibiting high three-way purification performance, as well as suppressing fluctuations in the air/fuel ratio, by using a material containing complex oxide having Nd and Pr in the crystalline substrate, as the OSC material contained in the TWC 33 used in the GPF 32. In the above way, upon using the TWC 33 which is suited to the filter substrate, the present embodiment can exhibit superior exhaust purification performance, while suppressing an increase in pressure loss in the overall exhaust purification system, by making the content of OSC material in the GPF 33 even less than the upstream catalytic converter 31.

In addition thereto, the present embodiment uses the output signals of the LAF sensor 51 and $O_2$ sensor 52 which are provided on the upstream sides of the upstream catalytic converter 31 and GPF 32, respectively, in order to avoid a decline in the three-way purification performance of the GPF 32 caused by decreasing the content of OSC material used in the GPF 32, and then manipulates the air/fuel ratio of the mixture to the engine 1 so that the air/fuel ratio of exhaust gas flowing into the GPF 32 converges to the post-stage target value set in the vicinity of a stoichiometric ratio. First, with the present embodiment, a greater amount of OSC material than the GPF 32 is provided to the upstream catalytic converter 31. For this reason, fluctuations in the air/fuel ratio are suppressed in the course of passing through the upstream catalytic converter 31; therefore, it is possible to stabilize the air/fuel ratio of exhaust gas flowing into the GPF 32. In this way, with the present embodiment, it is possible to achieve both suppression of pressure loss due to decreasing the content of OSC material in the GPF 32 and improve the exhaust purification performance, by stabilizing the air/fuel ratio of exhaust gas flowing into the GPF 32 by appropriately distributing the content of OSC material to the upstream catalytic converter 31 and GPF 32, and then further using the LAF sensor 51 and $O_2$ sensor 52, and manipulating the air/fuel ratio of the mixture so as to converge the mixture of exhaust gas in the GPF 32 to the post-stage target value set in the vicinity of a stoichiometric ratio.

In addition, with the present embodiment, the target air/fuel ratio KCMD relative to the output signal KACT of the LAF sensor 51 on the upstream side of the upstream catalytic converter 31 is set so that the output signal $VO_2$ of the $O_2$ sensor 52 converges to the post-stage target value set in the vicinity of a stoichiometric ratio. Then, the fuel injection amount, which is the manipulated variable for manipulating the air/fuel ratio of the mixture to be combusted in the engine 1, is determined so that the output signal KACT of the LAF sensor 51 becomes the target air/fuel ratio KCMD. It is thereby possible to set the target air/fuel ratio KCMD taking into account the response lag, dead time, etc. of the control system from the output signal of the LAF sensor 51 at the upstream catalytic converter 31 until the output signal of the $O_2$ sensor 52, so that the air/fuel ratio of exhaust gas flowing into the GPF 32 converges to the post-stage target value set in the vicinity of a stoichiometric ratio, i.e. so that the three-way purification performance of the TWC 33 continues to be exhibited.

Figure 17:
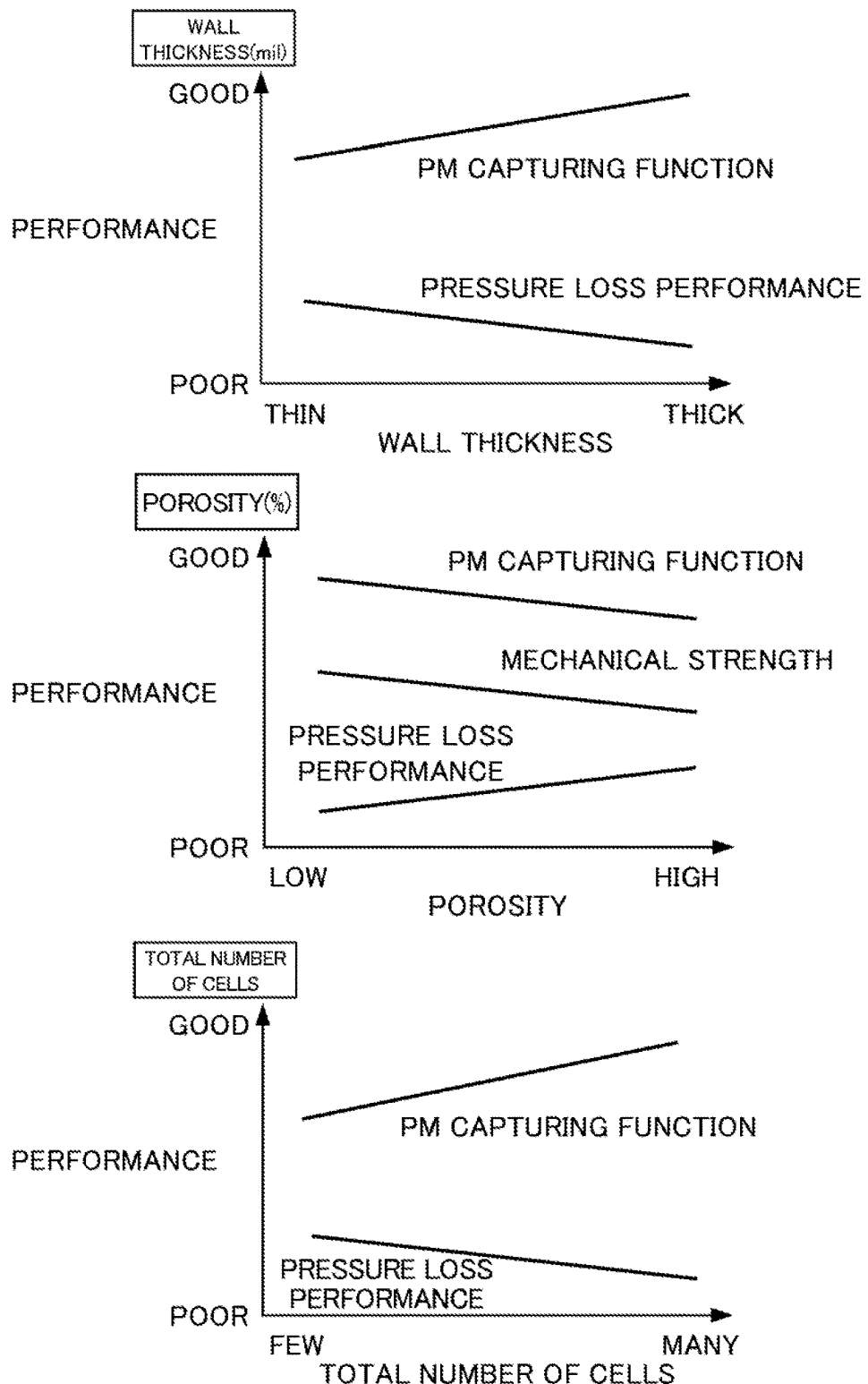
FIG. 17 is a graph showing the relationship between the wall thickness, porosity and cell number, which are parameters characterizing the filter substrate of the GPF, and the PM capturing function, pressure loss performance, etc. of the GPF.

In addition, with the present embodiment, the thickness of the barrier wall in the filter substrate of the GPF 32 is made larger than the thickness of the honeycomb substrate of the upstream catalytic converter 31. It is thereby possible to achieve a PM capturing function to the extent required in the GPF 32. However, as shown in FIG. 17, although the PM capturing function improves when thickening the barrier wall of the filter substrate, the pressure loss will increase. Therefore, with the present embodiment, the porosity of the barrier walls in the filter substrate is made higher than the porosity of the barrier walls in the honeycomb substrate. It is thereby possible to suppress an increase in pressure loss of the GPF 32. However, when raising the porosity, the mechanical strength of the filter substrate will decline as shown in FIG. 17. Therefore, in order to ensure sufficient mechanical strength to the filter substrate, the porosity cannot be excessively increased, and thus the pressure loss cannot be sufficiently reduced. Therefore, in the present embodiment, the total number of cells formed by the barrier wall of the filter substrate is made less than the total number of cells formed in the honeycomb substrate. With the present embodiment, it is possible to achieve sufficient PM capturing function, mechanical strength and pressure loss performance, by setting the wall thickness, porosity and cell number of the GPF 32 in the above way.

In addition, the present embodiment micronizes with the average pore diameter of the barrier wall 323 set to at least 15 μm, and the particle size D90 of the TWC 33 set to no more than 5 μm. It is thereby possible to introduce the micronized TWC 33 within the pores of the barrier wall 323, and possible to load the TWC 33 on the surfaces inside such pores. Therefore, according to the present embodiment, it is possible to avoid an increase in the pressure loss of the GPF 32 occurring from the TWC 33 being loaded only on the surface of the barrier wall 323, and moreover, possible to exhibit higher three-way purification performance.

In addition, with the present embodiment, the TWC 33 is configured to contain Rh and Pd, and is loaded onto the surfaces inside the pores within the barrier wall 323 in a state mixing this Rh and Pd. Conventionally, in the case of mixing Rh and Pd on the GPF 32 as mentioned above, as a result of Ba added to the Pd layer either contacting or being near Rh, the Rh is oxidized to form an oxide by the electron donating action of Ba, whereby the NOx purification performance greatly declines. In contrast, according to the present embodiment, it is possible to avoid a decline in the NOx purification performance of Rh by way of the aforementioned steam-reforming reaction, and thus possible to provide the GPF 32 that can exhibit superior three-way purification function to conventional. In addition, since it is difficult to load conventional TWC having a two-layer structure of the Rh layer and Pd layer on the surfaces inside the pores of the barrier wall, and further, high three-way purification performance is exhibited in the state mixing Rh and Pd according to the present embodiment, it becomes a catalyst composition preferred in the loading onto the surfaces within pores of the barrier wall 323.

In addition, with the present embodiment, the TWC 33 is configured to be free of Ba. According to the present embodiment, since Ba is not contained in the TWC 33, it is possible to avoid oxide formation of Rh from progressing due to Ba in the aforementioned way, and thus the NOx purification performance from declining.

In addition, with the present embodiment, a configuration is established in which Nd and Pr are contained in at least 10% by mass in the crystalline structure of the complex oxide. More superior three-way purification performance is thereby exhibited.

It should be noted that the present invention is not to be limited to the above-mentioned embodiment, and that modifications, improvements, etc. of a scope that can achieve the objects of the present invention are encompassed by the present invention.

EXAMPLES

Next, examples of the GPF 32 in the exhaust purification system 2 according to the above-mentioned embodiment will be explained; however, the GPF 32 is not to be limited to the following examples.

Examples 1 to 21 and Comparative Examples 1 to 4

TWC, carrier, complex oxide, etc. were prepared by the following sequence in the proportions shown in Table 1. First, a slurry was prepared by adding water-based medium and additives, followed by mixing in a ball mill. Next, the slurry was pulverized by wet pulverization or the like to adjust the particle size. Next, the GPF was immersed in the mixed slurry one time by a dipping method. The loading amount (washcoat amount) was set to 60 g/L (except for Examples 10 to 13). Subsequently, a GPF on which TWC was loaded was obtained by calcining at 700° C. for 2 hours. It should be noted that a honeycomb structure made by NGK (inside diameter 25.4 (φ1 inch) mm, average pore diameter 20 μm (excluding Examples 8 and 9), wall thickness 8 mil (excluding Examples 17 and 18), cell number 300, material cordierite, volume 15 cc) was used as the GPF.

TABLE 2

| | Contained elements in complex oxide (mass %) | | | | | | | Metal | | | D90 | Washcoat amount | Average pore diameter | Wall thickness |
|---|---|---|---|---|---|---|---|---|---|---|---|---|---|---|
| | Ce | Zr | Y | La | Nd | Pr | Total | Catalyst | | Added Ba | (μm) | (g/L) | (μm) | (mil) |
| Example 1 | 41 | 45 | 0 | 0 | 7 | 7 | 100 | Rh | Pd | None | 3 | 60 | 20 | 8 |
| Example 2 | 41 | 45 | 0 | 0 | 7 | 7 | 100 | Rh | Pd | None | 0.5 | 60 | 20 | 8 |
| Example 3 | 41 | 45 | 0 | 0 | 7 | 7 | 100 | Rh | Pd | None | 1 | 60 | 20 | 8 |
| Example 4 | 41 | 45 | 0 | 0 | 7 | 7 | 100 | Rh | Pd | None | 2.5 | 60 | 20 | 8 |
| Example 5 | 41 | 45 | 0 | 0 | 7 | 7 | 100 | Rh | Pd | None | 3.5 | 60 | 20 | 8 |
| Example 6 | 41 | 45 | 0 | 0 | 7 | 7 | 100 | Rh | Pd | None | 5 | 60 | 20 | 8 |
| Example 7 | 41 | 45 | 0 | 0 | 7 | 7 | 100 | Rh | Pd | None | 8 | 60 | 20 | 8 |
| Example 8 | 41 | 45 | 0 | 0 | 7 | 7 | 100 | Rh | Pd | None | 3 | 60 | 16 | 8 |
| Example 9 | 41 | 45 | 0 | 0 | 7 | 7 | 100 | Rh | Pd | None | 3 | 60 | 23 | 8 |
| Example 10 | 41 | 45 | 0 | 0 | 7 | 7 | 100 | Rh | Pd | None | 3 | 40 | 20 | 8 |
| Example 11 | 41 | 45 | 0 | 0 | 7 | 7 | 100 | Rh | Pd | None | 3 | 54 | 20 | 8 |
| Example 12 | 41 | 45 | 0 | 0 | 7 | 7 | 100 | Rh | Pd | None | 3 | 66 | 20 | 8 |
| Example 13 | 41 | 45 | 0 | 0 | 7 | 7 | 100 | Rh | Pd | None | 3 | 80 | 20 | 8 |
| Example 14 | 41 | 53 | 0 | 0 | 3 | 3 | 100 | Rh | Pd | None | 3 | 60 | 20 | 8 |
| Example 15 | 41 | 47 | 0 | 0 | 6 | 6 | 100 | Rh | pd | None | 3 | 60 | 20 | 8 |
| Example 16 | 41 | 43 | 0 | 0 | 8 | 8 | 100 | Rh | Pd | None | 3 | 60 | 20 | 8 |
| Example 17 | 41 | 45 | 0 | 0 | 7 | 7 | 100 | Rh | Pd | None | 3 | 60 | 20 | 6.5 |
| Example 18 | 41 | 45 | 0 | 0 | 7 | 7 | 100 | Rh | Pd | None | 3 | 60 | 20 | 10 |
| Example 19 | 41 | 45 | 0 | 0 | 7 | 7 | 100 | Rh | — | None | 3 | 60 | 20 | 8 |
| Example 20 | 41 | 45 | 0 | 0 | 7 | 7 | 100 | Rh | Pd | Ba (Solid) | 3 | 60 | 20 | 8 |
| Example 21 | 41 | 45 | 0 | 0 | 7 | 7 | 100 | Rh | Pd | Ba (Liquid) | 3 | 60 | 20 | 8 |
| Comparative Example 1 | 41 | 45 | 7 | 7 | 0 | 0 | 100 | Rh | Pd | None | 3 | 60 | 20 | 8 |
| Comparative Example 2 | 41 | 52 | 0 | 0 | 7 | 0 | 100 | Rh | Pd | None | 3 | 60 | 20 | 8 |
| Comparative Example 3 | 41 | 52 | 0 | 0 | 0 | 7 | 100 | Rh | Pd | None | 3 | 60 | 20 | 8 |
| Comparative Example 4 | 30 | 70 | 0 | 0 | 0 | 0 | 100 | Rh | Pd | None | 3 | 60 | 20 | 8 |

<NOx Purification Performance>

Figure 7:
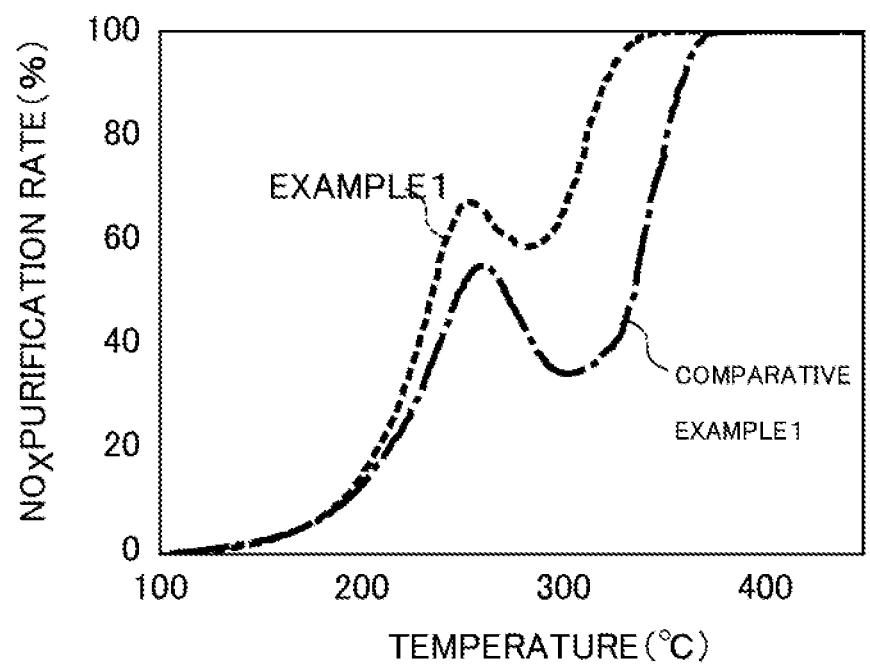
FIG. 7 is a graph showing the relationship between temperature and NOx purification rate for Example 1 and Comparative Example 1.

FIG. 7 is a graph showing the relationship between temperature and NOx purification rate for Example 1 and Comparative Example 1. More specifically, it is a graph showing, with regards to Example 1 which adds Nd and Pr to the OSC material, and Comparative Example 1 which adds Y and La thereto, the results of evaluating the NOx purification performance of the GPF according to the following conditions. As shown in FIG. 7, it was found that the purification of NOx progressed at lower temperatures for Example 1 than Comparative Example 1. From these results, it was confirmed that Example 1 in which Nd and Pr are added to the OSC material in the GPF had improved NOx purification performance compared to Comparative Example 1 in which Y and La are added thereto.

(NOx Purification Performance Evaluation Conditions)

The NOx purification performance was evaluated by measuring the NOx concentration when heating the GPF at 20° C./min up to 500° C. in stoichiometric gas.

<Air/Fuel Ratio Absorbance>

Figure 8:
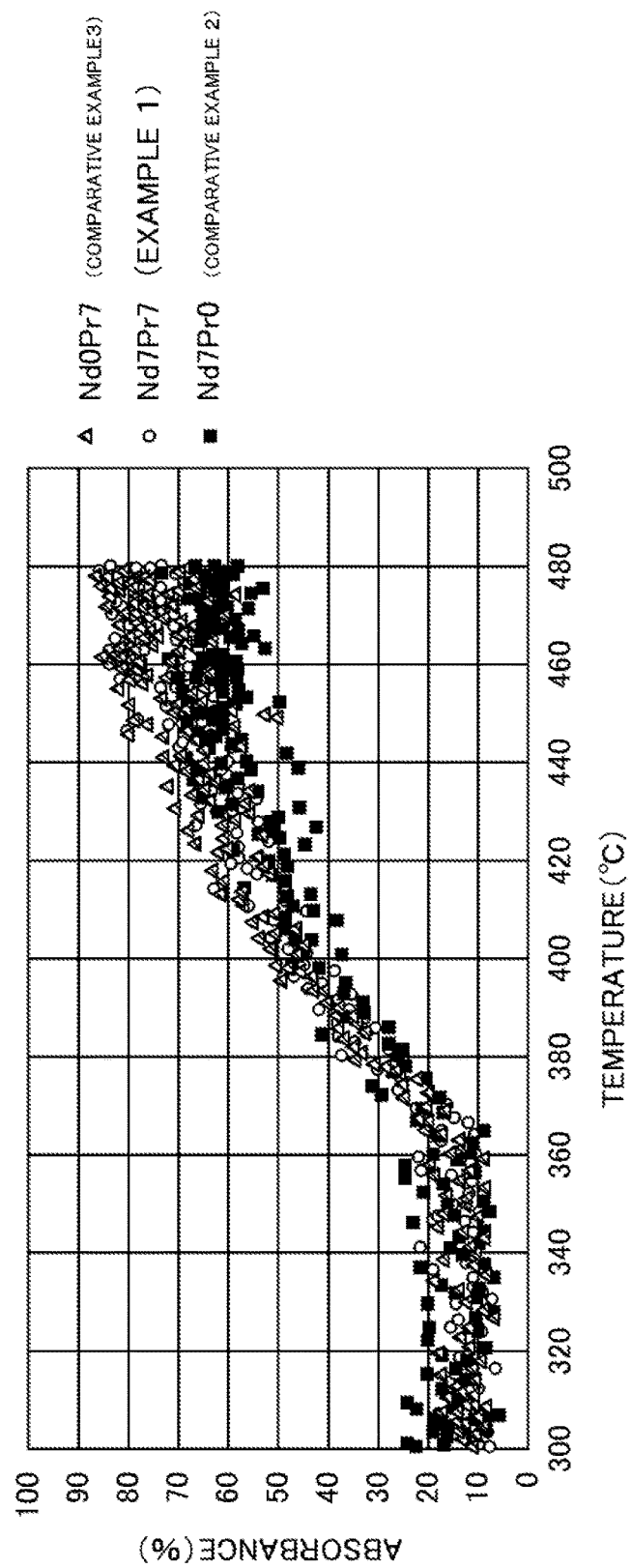
FIG. 8 is a graph showing the relationship between temperature and air/fuel ratio absorbance for Example 1 and Comparative Examples 2 and 3.

FIG. 8 is a graph showing the relationship between the temperature and air/fuel ratio absorbance of Example 1 and Comparative Examples 2 and 3. More specifically, it is a graph showing the results of measuring the air/fuel ratio absorbance of the GPF for each of Comparative Example 2 in which only Nd is added to the OSC material, Comparative Example 3 in which only Pr is added thereto, and Example 1 which uses both Nd and Pr. The air/fuel ratio absorbance was calculated using Formula (1) according to the following conditions.

$$\text{Air/fuel ratio absorbance (\%)} = ((\text{air/fuel ratio amplitude (IN)} - \text{air/fuel ratio amplitude (OUT)})/\text{air/fuel ratio amplitude (IN)}) \times 100 \quad \text{Formula (1)}$$

(In Formula (1), "air/fuel ratio amplitude (IN)" indicates the air/fuel ratio amplitude prior to passing through the OSC material, and "air/fuel ratio amplitude (OUT)" indicates the air/fuel ratio amplitude after passing through the OSC material.

(Air/Fuel Ratio Absorbance Measurement Conditions)

Using an actual engine, the air/fuel ratio was amplified to 14.5+/−1.0 (1 Hz), and the air/fuel ratio absorbance was measured when heating at 30° C./min.

As shown in FIG. 8, it was found that Example 1 and Comparative Example 3 have higher air/fuel ratio absorbance compared to Comparative Example 2. Based on these results, it was confirmed that the GPF in which Pr was added to the OSC material could suppress fluctuations in air/fuel ratio, and tends to keep the air/fuel ratio at a stoichiometric ratio.

<D90>

Figure 9:
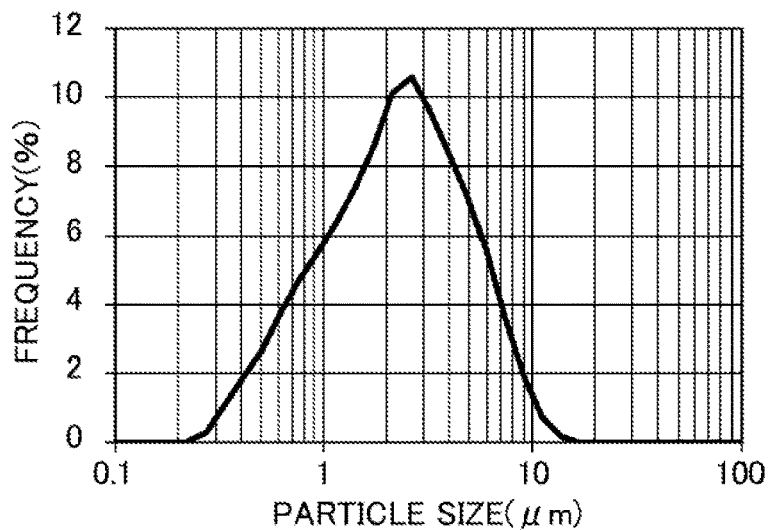
FIG. 9 is a graph showing the particle size distribution of TWC for Example 6.

FIG. 9 is a graph showing the particle size distribution of TWC for Example 6. As shown in FIG. 9, it was confirmed that the D90 of TWC particles become no more than 5 μm. It should be noted that the particle size distribution was measured according to the following measurement conditions similarly for other Examples and Comparative Examples. The obtained D90 were as shown in Table 1.

(Particle Size Distribution Measurement Conditions)

Instrument: Laser diffraction particle size distribution analyzer (SALD-3100, manufactured by Shimadzu).
Measurement Method: Laser scattering method <Loading State>

Figure 10:
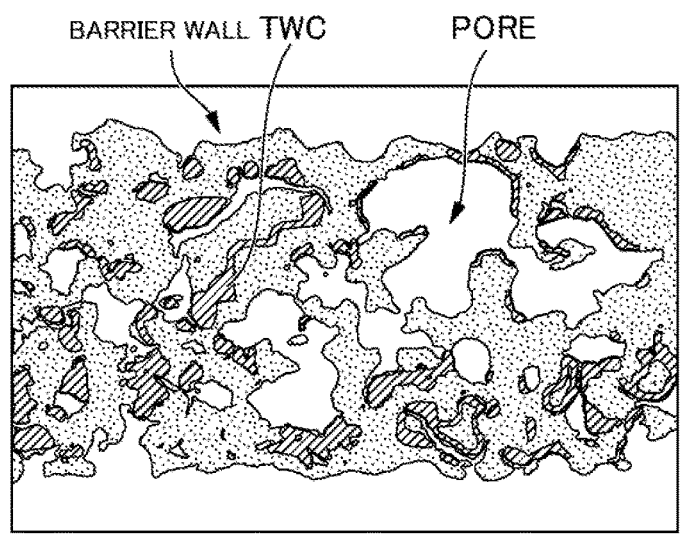
FIG. 10 is a view showing a loading state of TWC within the barrier wall of the GPF of Example 1.

FIG. 10 is a view showing the loading state of TWC within the barrier wall of the GPF of Example 1. More specifically, it is a mapping obtained by conducting cross-sectional SEM observation and elemental analysis by EPMA according to the following conditions on the loading state of TWC within the barrier wall of the GPF according to Example 1. Based on these results, it was confirmed that, in the case of the average pore diameter of the barrier wall being at least 15 μm, and the D90 of TWC being no more than particle size 5 μm, the TWC was uniformly loaded within the barrier wall. It should be noted that it was confirmed that, also for other Examples in which the particle size of TWC was no more than 5 μm, TWC was similarly loaded uniformly within the barrier wall.

(EPMA Measurement Conditions)

Instrument: Electron probe micro analyzer (JXA-8100, manufactured by JEOL). Measurement conditions: acceleration voltage 15 KV, illumination current 0.05 μA, pixel size 1 μm, data collection time per 1 cell: 38 ms, beam width 0.7 μm <Relationship Between D90 and Pressure Loss>

Figure 11:
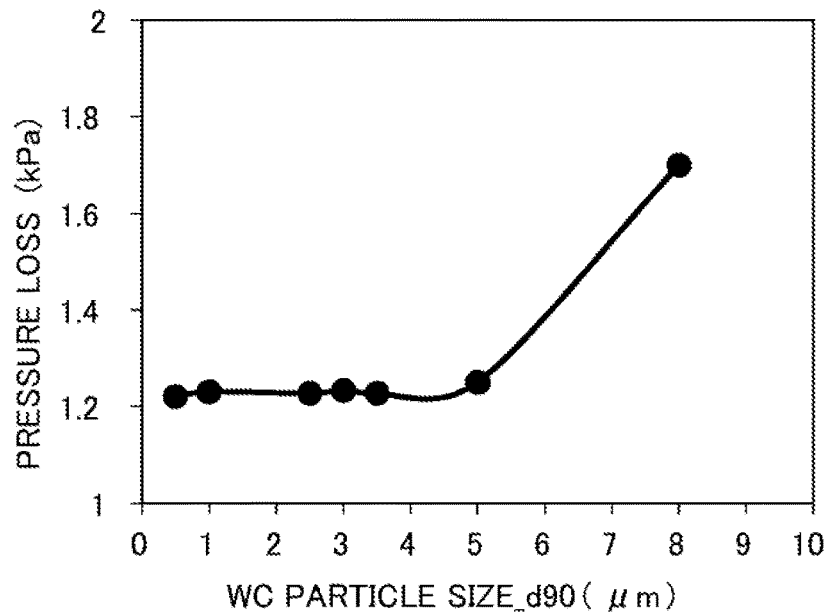
FIG. 11 is a graph showing the relationship between D90 of TWC and pressure loss for Examples 1 to 7.

FIG. 11 is a graph showing the relationship between D90 of the TWC loaded on the GPFs of Examples 1 to 7 and pressure loss. As shown in FIG. 11, it was found that Examples 1 to 6, which have D90 of no more than 5 μm, stayed at a low level at which pressure loss was substantially constant; whereas, the pressure loss increases when the D90 exceeded 5 μm as in the GPF of Example 7 having D90 of 8 μm. Based on these results, it was confirmed that it was preferable for the D90 of the TWC loaded on the GPF to be no more than 5 μm.

<Relationship Between Average Pore Diameter and Pressure Loss>

Figure 12:
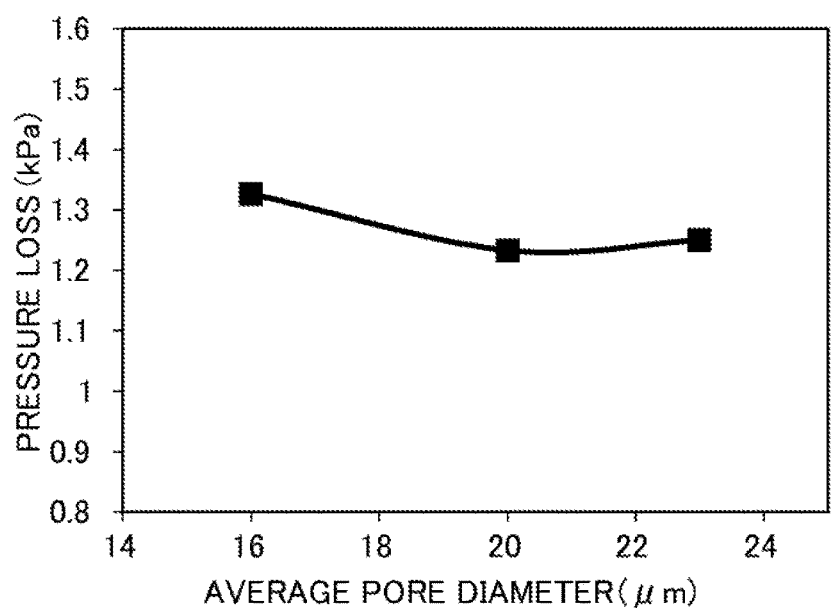
FIG. 12 is a graph showing the relationship between average pore diameter of the barrier wall of the GPF and pressure loss for Example 1 and Examples 8 and 9.

FIG. 12 is a graph showing the relationship between the average pore diameter of the barrier wall of the GPFs of Examples 1, 8 and 9, and pressure loss. As shown in FIG. 12, it was found that, although the pressure loss somewhat increases as the average pore diameter becomes smaller, the pressure loss stayed at a low level. Based on these results, it was confirmed that it is preferable for the average pore diameter of the GPF to be at least 5 μm.

<Relationship Between Washcoat (WC) Amount and Pressure Loss>

Figure 13:
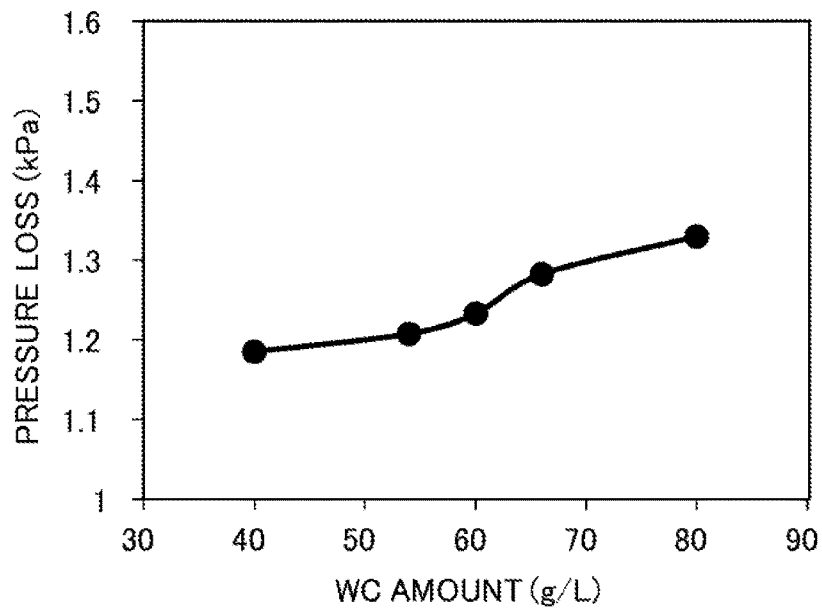
FIG. 13 is a graph showing the relationship between the washcoat amount of TWC and pressure loss for Example 1 and Examples 10 to 13.

FIG. 13 is a graph showing the relationship between the washcoat amount of TWC for Examples 1 and 10 to 13, and the pressure loss. As shown in FIG. 13, it was found that, although the pressure loss increased as the washcoat amount increased, the pressure loss of the GPF of Example 13 having a washcoat amount of 80 g/L stayed at a low level. Based on these results, it was confirmed that the washcoat amount of TWC is preferably no more than 80 g/L.

<Relationship Between Wall Thickness and Pressure Loss>

Figure 14:
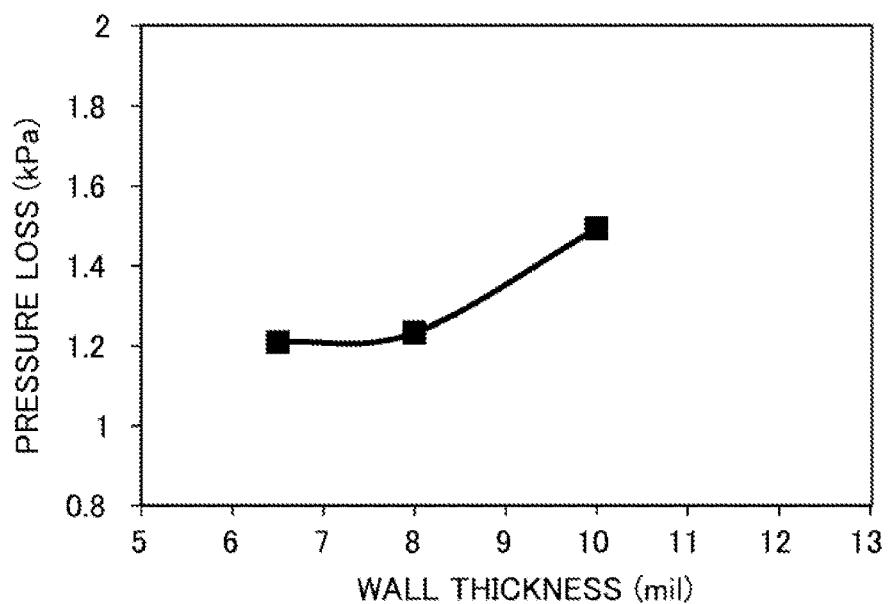
FIG. 14 is a graph showing the relationship between the wall thickness of the GPF and the pressure loss for Example 1 and Examples 17 and 18.

FIG. 14 is a graph showing the relationship between wall thickness of the GPFs of Examples 1, 17 and 18, and pressure loss. As shown in FIG. 14, it was found that, although the pressure loss increased as the wall thickness increased, the pressure loss of the GPF of Example 18 having a wall thickness of 10 mil stayed at a low level. Based on these results, it was confirmed that the wall thickness of the GPF was preferably no more than 10 mil.

<Purification Performance According to Presence of Pd>

Figure 15A:
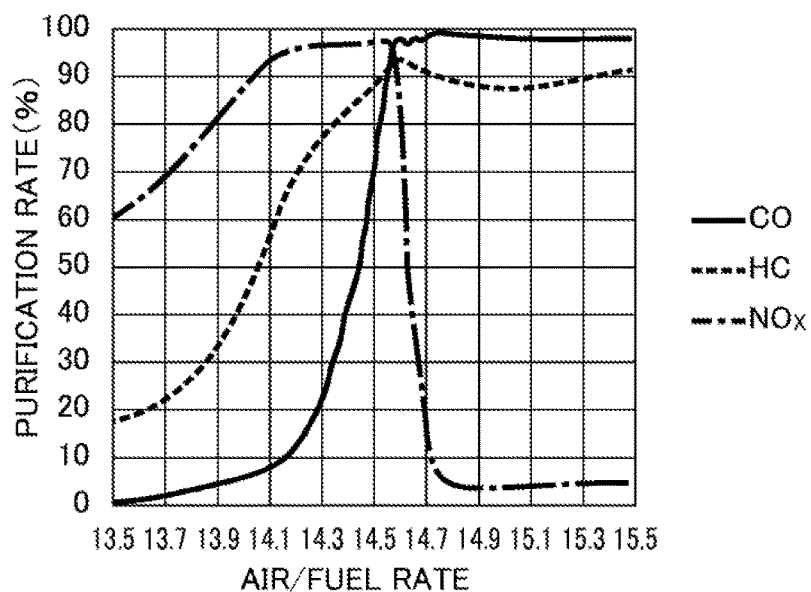
FIG. 15A is a graph showing the relationship between the air/fuel ratio and purification rate of the GPF for Example 1.
Figure 15B:
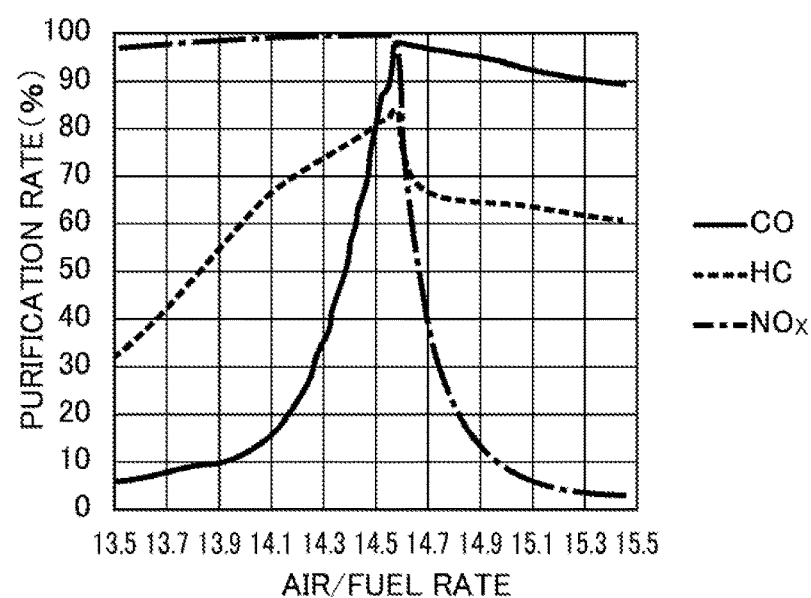
FIG. 15B is a graph showing the relationship between the air/fuel ratio and purification rate of the GPF for Example 19.

FIG. 15A and FIG. 15B are graphs showing the relationship between the air/fuel ratio at the GPFs of Examples 1 and 19, and the purification rates for CO, HC and NOx, respectively. In the graphs, the vertical axis indicates the purification rates of CO, HC and NOx, respectively, and the horizontal axis indicates the air/fuel ratio which is the ratio of air to fuel. It should be noted that stoichiometric ratio indicates a range in which the air/fuel ratio is approximately 14.5. Rh and Pd are contained in the TWC loaded on the GPF of Example 1, and only Rh is contained in the TWC loaded on the GPF of Example 19. Evaluation conditions were set according to the following conditions. Based on the evaluation results of FIG. 15A and FIG. 15B, it was found that, compared with the GPF of Example 1 in which Rh and Pd are contained, the GPF of Example 19 in which only Rh is contained had lower HC purification rate in the range in which the air/fuel ratio is higher than a stoichiometric ratio. Based on these results, it was confirmed that, compared with Example 19 which solely uses Rh as the TWC loaded on the GPF, Example 1 which jointly uses Rh and Pd had higher three-way purification performance.
(HC, CO, NOx Purification Performance Evaluation Conditions)

Using an actual engine, the air/fuel ratio was continuously varied for 20 minutes from 13.5 to 15.5 at a catalyst inlet temperature of 500° C., and the purification rates for HC, CO and NOx were measured.

<Purification Performance According to Presence of Ba>

Figure 15C:
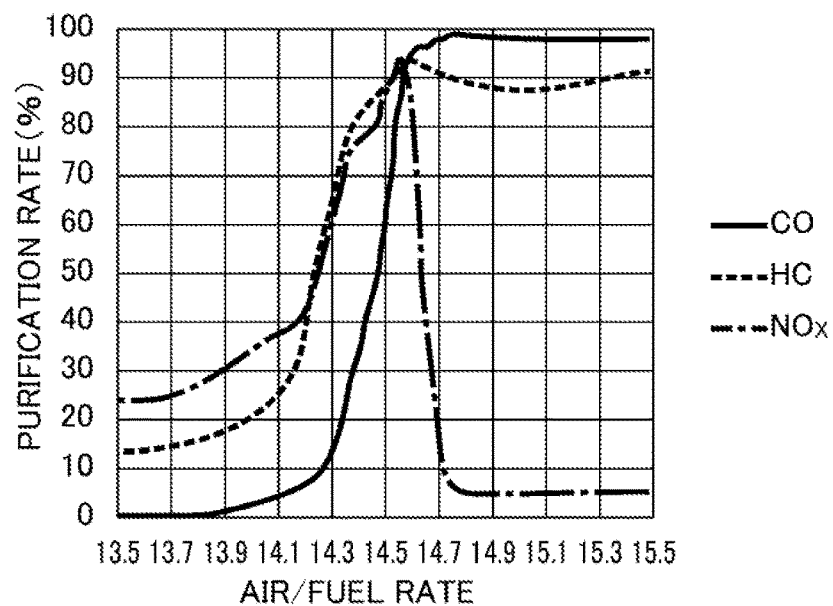
FIG. 15C is a graph showing the relationship between the air/fuel ratio and purification rate of the GPF for Example 20.
Figure 15D:
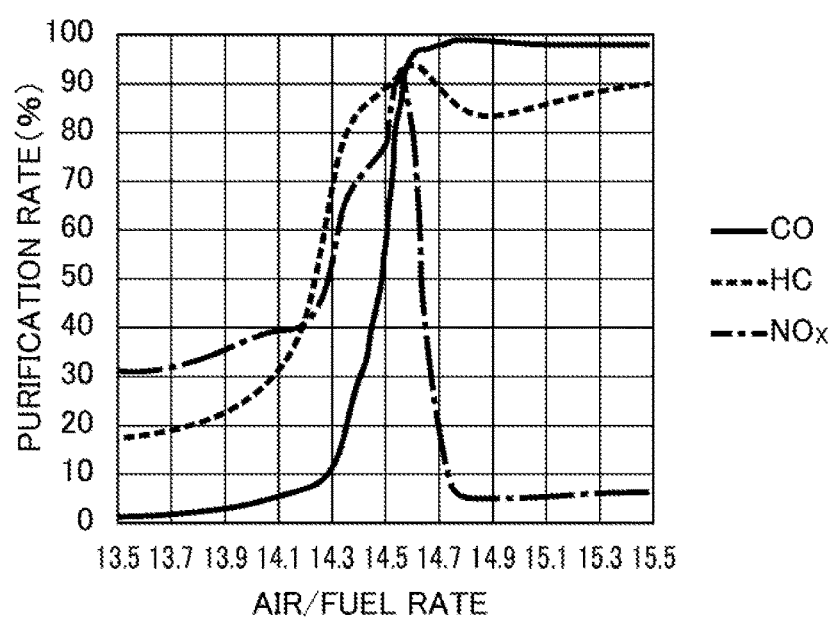
FIG. 15D is a graph showing the relationship between the air/fuel ratio and purification rate of the GPF for Example 21.

FIG. 15C and FIG. 15D are graphs showing the relationship between the air/fuel ratio at the GPFs of Example 20 and Example 21, and the purification rates for CO, HC and NOx, respectively. Solid Ba (Ba sulfate) is contained along with Rh and Pd in the TWC loaded on the GPF of Example 20, and liquid Ba (Ba acetate and Ba nitrate) is contained along with Rh and Pd in the TWC loaded on the GPF of Example 21. In addition, although Rh and Pd are contained in the TWC loaded on the GPF of Example 1 (FIG. 15A) described earlier, Ba is not contained. Refer to this for comparison. Regarding the evaluation conditions, evaluation was performed at similar conditions to the above-mentioned HC, CO and NOx purification performance evaluation conditions. Based on the evaluation results in FIG. 15A, FIG. 15C and FIG. 15D, it was found that the GPFs of Examples 20 and 21 containing solid Ba or liquid Ba had low NOx purification rate in the region in which the air/fuel ratio was lower than a stoichiometric ratio, compared to the GPF of Example 1 which was free of Ba. Based on these results, it was confirmed that Example 1 in which Ba is not contained in the TWC loaded on the GPF has higher exhaust purification performance compared to Example 20 and Example 21 in which Ba is contained.

<Purification Performance According to Differences in Total Content of Nd and Pd>

Figure 16A:
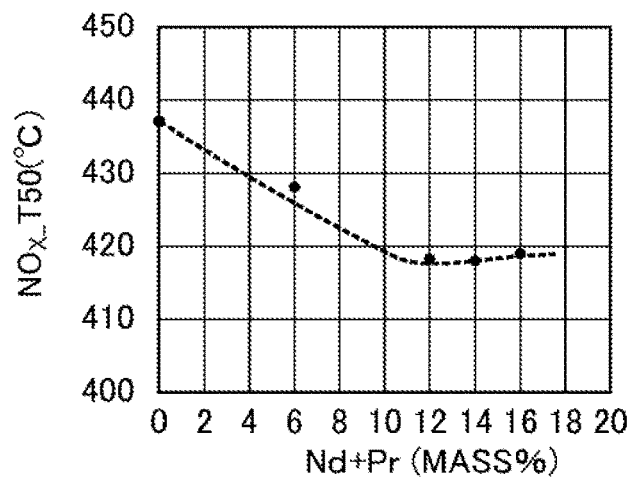
FIG. 16A is a graph showing the relationship between the total content of Nd and Pr and the NOx_T50.
Figure 16B:
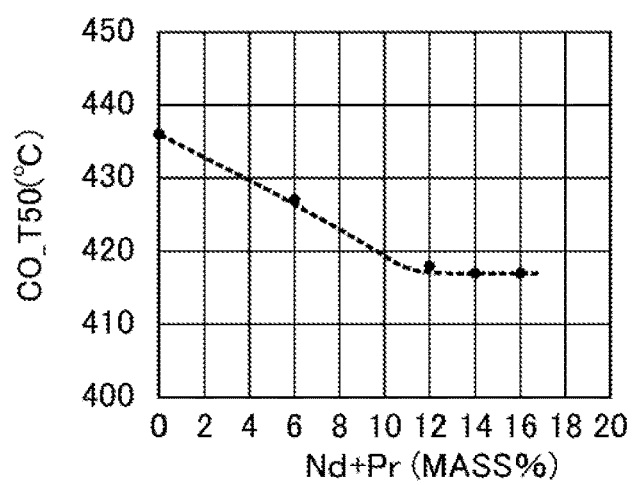
FIG. 16B is a graph showing the relationship between the total content of Nd and PR and the CO_T50.
Figure 16C:
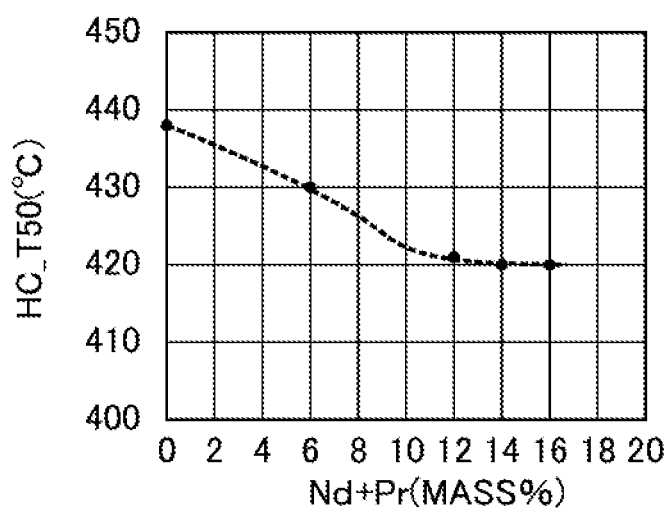
FIG. 16C is a graph showing the relationship between the total content of Nd and Pr and the HC_T50.

FIG. 16A to FIG. 16C are graphs showing the relationships between the total content of Nd and Pr contained in the GPFs of Example 1, Example 14, Example 15, Example 16 and Comparative Example 4, and the NOx_T50, CO_T50 and HC_T50, respectively. NOx_T50, CO_T50 and HC_T50 indicate the temperatures at which 50% of the CO, HC and NOx are purified, respectively, and are shown on the vertical axis in the graphs. The horizontal axis shows the total content (mass %) of Nd and Pr in the complex oxide. The total content of Nd and Pr are 0, 6, 12, 14 and 16% by mass in order of Comparative Example 4, Example 14, Example 15, Example 1 and Example 16. As shown in FIG. 16A to FIG. 16C, it was found that the GPFs of Example 1, Example 14, Example 15 and Example 16 purified NOx, CO and HC at lower temperatures relative to Comparative Example 4. Therefore, it was confirmed that, to exhibit the three-way purification performance in the GPF of the present embodiment, it is preferable for the total content of Nd and Pr to be 10% by mass to 20% by mass, and it was more preferable if 12% by mass to 16% by mass.

EXPLANATION OF REFERENCE NUMERALS 1 engine (internal combustion engine)
2 exhaust purification system
3 exhaust pipe (exhaust passage)
31 upstream catalytic converter (upstream three-way catalyst)
32 GPF (downstream filter)
33, 33a, 33b . . . TWC (downstream three-way catalyst)
320 filter substrate
323 barrier wall
321 inlet-side cell (cell)
322 outlet-side cell (cell)
324 inlet-side sealed part
324 outlet-side sealed part
51 LAF sensor (first air/fuel ratio sensor)
52 $O_2$ sensor (second air/fuel ratio sensor)
6 ECU (air/fuel ratio controller, pre-stage air/fuel ratio setting means, manipulated variable deciding means)

The invention claimed is:

1. An exhaust purification system of an internal combustion engine, comprising:
   a first air/fuel ratio sensor that is provided in an exhaust passage of the internal combustion engine, and generates a signal according to an air/fuel ratio of exhaust gas;
   an upstream catalytic converter that is provided on a downstream side of a detection location of the first air/fuel ratio sensor in the exhaust passage, and has a catalyst for purifying the exhaust gas;
   a second air/fuel ratio sensor that is provided on a downstream side of the upstream catalytic converter in the exhaust passage, and generates a signal according to the air/fuel ratio of the exhaust gas;
   a downstream filter that is provided on a downstream side of a detection location of the second air/fuel ratio sensor in the exhaust passage, and purifies by capturing particulate matter in the exhaust gas; and
   an air/fuel ratio controller that manipulates the air/fuel ratio of a mixture to be combusted in the internal combustion engine so that the air/fuel ratio of exhaust gas flowing into the downstream filter converges to a post-stage target value set to the vicinity of a stoichiometric ratio, using an output signal of the first air/fuel ratio sensor and an output signal of the second air/fuel ratio sensor,
   wherein the downstream filter includes: a filter substrate in which a plurality of cells extending from an inlet-side end face until an outlet-side end face of exhaust gas are formed to be divided by porous barrier walls, and an opening at the inlet-side end face and an opening at the outlet-side end face of the cells are alternately sealed; and a downstream three-way catalyst that is loaded on the barrier walls,
   wherein the downstream three-way catalyst contains a catalytic metal including at least Rh, and an Oxygen storage capacity (OSC) material having oxygen occlusion/release ability,
   wherein the OSC material of the downstream three-way catalyst contains a complex oxide having Nd and Pr in the crystalline structure thereof,
   wherein the upstream catalytic converter includes a honeycomb substrate in which a plurality of cells extending from an inlet-side end face to an outlet-side end face of exhaust gas is formed to be divided by porous barrier walls, and an upstream three-way catalyst loaded on the barrier walls of the honeycomb substrate,
   wherein the upstream three-way catalyst contains a catalytic metal and an OSC material having oxygen occlusion/release ability, and wherein the content of OSC material per unit volume of the filter substrate is less than the content of OSC material per unit volume of the honeycomb substrate.

2. The exhaust purification system of an internal combustion engine according to claim 1, wherein the air/fuel ratio controller includes: a pre-stage air/fuel ratio setting means for setting a pre-stage target value relative to the output signal of the first air/fuel ratio sensor so that the output signal of the second air/fuel ratio sensor converges to the post-stage target value; and a manipulated variable determination means for determining an manipulated variable for manipulating the air/fuel ratio of the mixture to be combusted in the internal combustion engine, so that the output signal of the first air/fuel ratio sensor reaches the pre-stage target value.

3. The exhaust purification system of an internal combustion engine according to claim 1,
wherein the thickness of the barrier walls of the filter substrate is larger than the thickness of the barrier walls of the honeycomb substrate,
wherein the porosity of the barrier walls of the filter substrate is higher than the porosity of the barrier walls of the honeycomb substrate, and
wherein a total number of cells formed in the filter substrate is smaller than a total number of cells formed in the honeycomb substrate.

4. The exhaust purification system of an internal combustion engine according to claim 1, wherein the barrier walls of the filter substrate have an average pore diameter of at least 15 µm, and
wherein the downstream three-way catalyst has a particle size D90 when a cumulative distribution from a small particle size side of the particle distribution is 90% of no more than 5 µm.

5. The exhaust purification system of an internal combustion engine according to claim 1, wherein the downstream three-way catalyst contains Rh and Pd as the catalytic metal, and is loaded on surfaces inside pores within the barrier walls of the filter substrate in a state in which Rh and Pd is mixed.

6. The exhaust purification system of an internal combustion engine according to claim 1, wherein the downstream three-way catalyst is constituted to be free of Ba.

7. The exhaust purification system of an internal combustion engine according to claim 1, wherein the total content of Nd and Pr contained in the complex oxide of the downstream three-way catalyst is at least 10% by mass.

8. The exhaust purification system of an internal combustion engine according to claim 2,
wherein the thickness of the barrier walls of the filter substrate is larger than the thickness of the barrier walls of the honeycomb substrate,
wherein the porosity of the barrier walls of the filter substrate is higher than the porosity of the barrier walls of the honeycomb substrate, and
wherein a total number of cells formed in the filter substrate is smaller than a total number of cells formed in the honeycomb substrate.

9. The exhaust purification system of an internal combustion engine according to claim 2, wherein the barrier walls of the filter substrate have an average pore diameter of at least 15 µm, and
wherein the downstream three-way catalyst has a particle size D90 when a cumulative distribution from a small particle size side of the particle distribution is 90% of no more than 5 µm.

10. The exhaust purification system of an internal combustion engine according to claim 2, wherein the downstream three-way catalyst contains Rh and Pd as the catalytic metal, and is loaded on surfaces inside pores within the barrier walls of the filter substrate in a state in which Rh and Pd is mixed.

11. The exhaust purification system of an internal combustion engine according to claim 2, wherein the downstream three-way catalyst is constituted to be free of Ba.

12. The exhaust purification system of an internal combustion engine according to claim 2, wherein the total content of Nd and Pr contained in the complex oxide of the downstream three-way catalyst is at least 10% by mass.

13. The exhaust purification system of an internal combustion engine according to claim 3, wherein the barrier walls of the filter substrate have an average pore diameter of at least 15 µm, and
wherein the downstream three-way catalyst has a particle size D90 when a cumulative distribution from a small particle size side of the particle distribution is 90% of no more than 5 µm.

14. The exhaust purification system of an internal combustion engine according to claim 3, wherein the downstream three-way catalyst contains Rh and Pd as the catalytic metal, and is loaded on surfaces inside pores within the barrier walls of the filter substrate in a state in which Rh and Pd is mixed.

15. The exhaust purification system of an internal combustion engine according to claim 3, wherein the downstream three-way catalyst is constituted to be free of Ba.

16. The exhaust purification system of an internal combustion engine according to claim 3, wherein the total content of Nd and Pr contained in the complex oxide of the downstream three-way catalyst is at least 10% by mass.

17. The exhaust purification system of an internal combustion engine according to claim 4, wherein the downstream three-way catalyst contains Rh and Pd as the catalytic metal, and is loaded on surfaces inside pores within the barrier walls of the filter substrate in a state in which Rh and Pd is mixed.

18. The exhaust purification system of an internal combustion engine according to claim 4, wherein the downstream three-way catalyst is constituted to be free of Ba.

19. The exhaust purification system of an internal combustion engine according to claim 4, wherein the total content of Nd and Pr contained in the complex oxide of the downstream three-way catalyst is at least 10% by mass.

* * * * *